(12) United States Patent
Yamasaki et al.

(10) Patent No.: US 6,344,142 B1  
(45) Date of Patent: Feb. 5, 2002

(54) WASTE WATER TREATMENT METHOD AND APPARATUS

(75) Inventors: Kazuyuki Yamasaki, Hiroshima; Norio Sawai, Kitakatsuragi-gun; Kazumi Chujo, Ayauta-gun, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/565,109

(22) Filed: May 4, 2000

(30) Foreign Application Priority Data

Jul. 5, 1999 (JP) .......................................... 11-190331

(51) Int. Cl.$^7$ .............................. C02F 1/52; C02F 1/58; C02F 3/28
(52) U.S. Cl. ...................... 210/614; 210/626; 210/709; 210/713; 210/724; 210/195.2; 210/195.3; 210/257.2; 210/202; 210/915; 210/603
(58) Field of Search ................................. 210/624, 626, 210/709, 713, 723, 724, 195.1, 195.2, 195.3, 197, 202, 257.2, 258, 259, 915, 614, 603

(56) References Cited

U.S. PATENT DOCUMENTS

| | | | | |
|---|---|---|---|---|
| 2,167,443 A | * | 7/1939 | Bevan .......................... 210/624 |
| 2,574,685 A | * | 11/1951 | Baxter et al. ............. 210/195.3 |
| 3,537,986 A | * | 11/1970 | Watanabe et al. .......... 210/626 |
| 3,605,775 A | * | 9/1971 | Zaander et al. ............. 210/709 |
| 4,111,802 A | * | 9/1978 | Louboutin ................... 210/713 |
| 4,329,224 A | * | 5/1982 | Kim ............................ 210/709 |
| 4,388,195 A | * | 6/1983 | Von Hagel et al. .......... 210/713 |
| 4,579,655 A | * | 4/1986 | Louboutin et al. .......... 210/202 |
| 5,618,439 A | * | 4/1997 | Allgulin ...................... 210/713 |
| 5,788,838 A | * | 8/1998 | Yamasaki et al. ........ 210/195.1 |
| 5,824,227 A | * | 10/1998 | Carghel et al. ............. 210/713 |
| 5,840,194 A | * | 11/1998 | Yokose et al. .............. 210/713 |
| 5,868,934 A | * | 2/1999 | Yamasaki et al. ........ 210/195.3 |

FOREIGN PATENT DOCUMENTS

JP 6-86988 A 3/1994

OTHER PUBLICATIONS

EckenFelder "Principles of Water Quality Management" p. 593, 1980.*
Steel & McGhee "Water Supply and Sewerage" p. 533, 1979.*

* cited by examiner

*Primary Examiner*—Christopher Upton  
(74) *Attorney, Agent, or Firm*—Nixon & Vanderhye P.C.

(57) ABSTRACT

In a waste water treatment apparatus, sludge settled in a settling tank is treated by being introduced (returned) into a return sludge reaction tank having a settling section in its rear portion. Therefore, unreacted chemicals contained in the sludge that has settled in the settling tank can be utilized in the return sludge reaction tank. Therefore, the unreacted chemicals are not discharged as sludge. Accordingly, as compared with the conventional treatment method of discharging a sludge from the settling tank, it is possible to reduce the amount of generated sludge remarkably and consequently, reduce a sludge disposal fee, the use amount of slaked lime, and a running cost such as maintenance cost of a dehydrator.

19 Claims, 26 Drawing Sheets

Fig.2A

With normal concentration of fluorine

| TANK | Retention time | Timing (elapsed time) 1hr 2hr 3hr 4hr 5hr 6hr 7hr 8hr 9hr 10hr 11hr 12hr 13hr 14hr 15hr 16hr 17hr 18hr 19hr |
|---|---|---|
| First tank | 2hr | |
| Second tank (Return sludge reaction tank) | 6hr | |
| Fourth tank | 1hr | |
| Fifth tank | 1hr | |
| Sixth tank | 1hr | |
| Seventh tank (Settling tank) | 3hr | |
| Eighth tank (Thickening tank) | 5hr | |

Fig.2B

With low concentration of fluorine

| TANK | Retention time | Timing (elapsed time) | | | | | | | | | | | | | | | | | | |
|---|---|---|---|---|---|---|---|---|---|---|---|---|---|---|---|---|---|---|---|---|
| | | 1hr | 2hr | 3hr | 4hr | 5hr | 6hr | 7hr | 8hr | 9hr | 10hr | 11hr | 12hr | 13hr | 14hr | 15hr | 16hr | 17hr | 18hr | 19hr |
| First tank | 1hr | ▮ | | | | | | | | | | | | | | | | | | |
| Second tank (Return sludge reaction tank) | 3hr | | ▮━━━▮ | | | | | | | | | | | | | | | | | |
| Fourth tank | 20min | | | | | ▮ | | | | | | | | | | | | | | |
| Fifth tank | 20min | | | | | ▮ | | | | | | | | | | | | | | |
| Sixth tank | 20min | | | | | | ▮ | | | | | | | | | | | | | |
| Seventh tank (Settling tank) | 3hr | | | | | | | ▮━━━▮ | | | | | | | | | | | | |
| Eighth tank (Thickening tank) | 5hr | | | | | | | | | | ▮━━━━━▮ | | | | | | | | | |

Fig.4A

With normal concentration of fluorine

| TANK | Retention time | Timing (elapsed time) 1hr 2hr 3hr 4hr 5hr 6hr 7hr 8hr 9hr 10hr 11hr 12hr 13hr 14hr 15hr 16hr 17hr 18hr 19hr |
|---|---|---|
| First tank | 2hr | |
| Second tank (Return sludge reaction tank) | 6hr | |
| Third tank | 20min | |
| Fourth tank | 1hr | |
| Fifth tank | 1hr | |
| Sixth tank | 1hr | |
| Seventh tank (Settling tank) | 3hr | |
| Eighth tank (Thickening tank) | 5hr | |

Fig.4B

With low concentration of fluorine

| TANK | Retention time | Timing (elapsed time) 1hr-19hr |
|---|---|---|
| First tank | 1hr | ▎(1hr) |
| Second tank (Return sludge reaction tank) | 3hr | ──── (2-5hr) |
| Third tank | 20min | ▁ (5hr) |
| Fourth tank | 20min | ▁ (6hr) |
| Fifth tank | 20min | ▏ (7hr) |
| Sixth tank | 20min | ▏ (7hr) |
| Seventh tank (Settling tank) | 3hr | ──── (8-11hr) |
| Eighth tank (Thickening tank) | 5hr | ────── (11-16hr) |

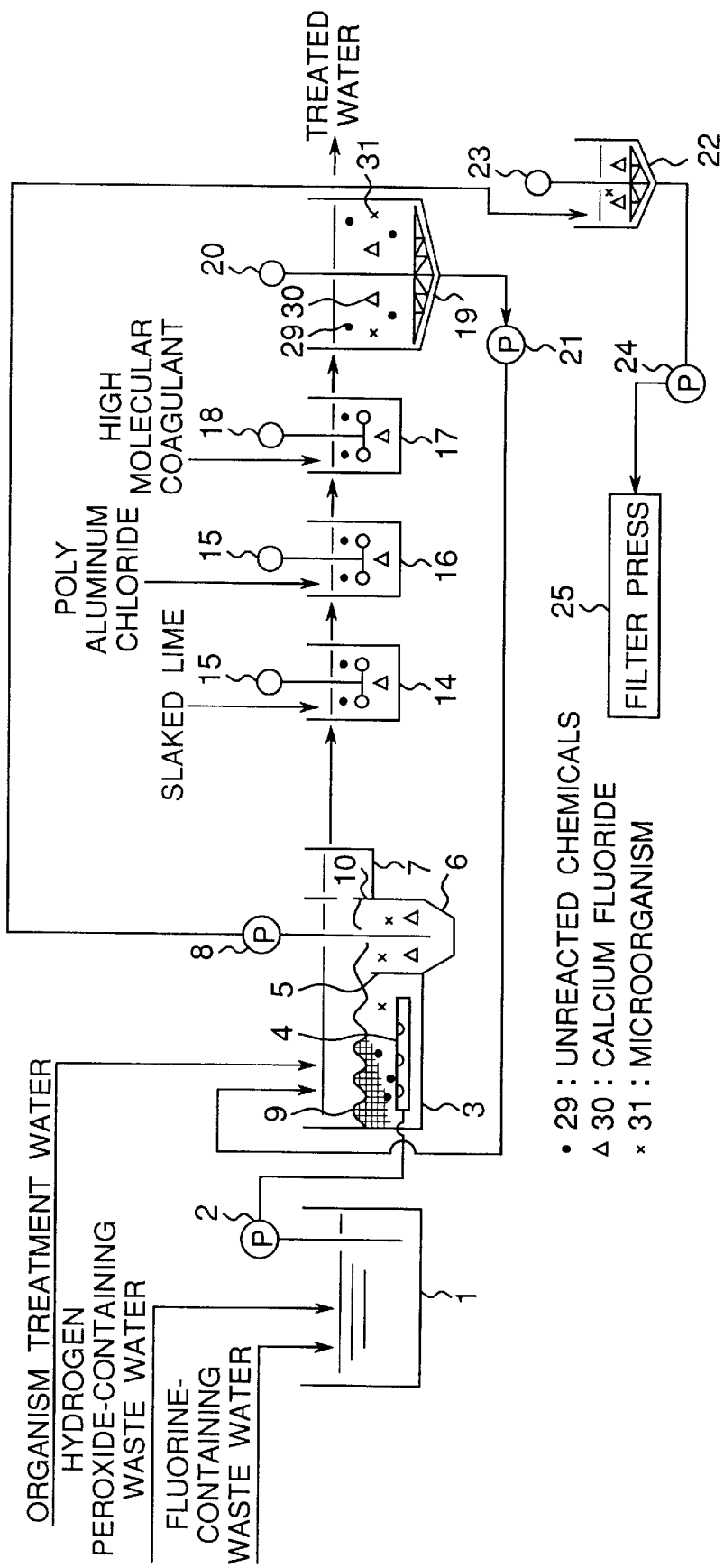

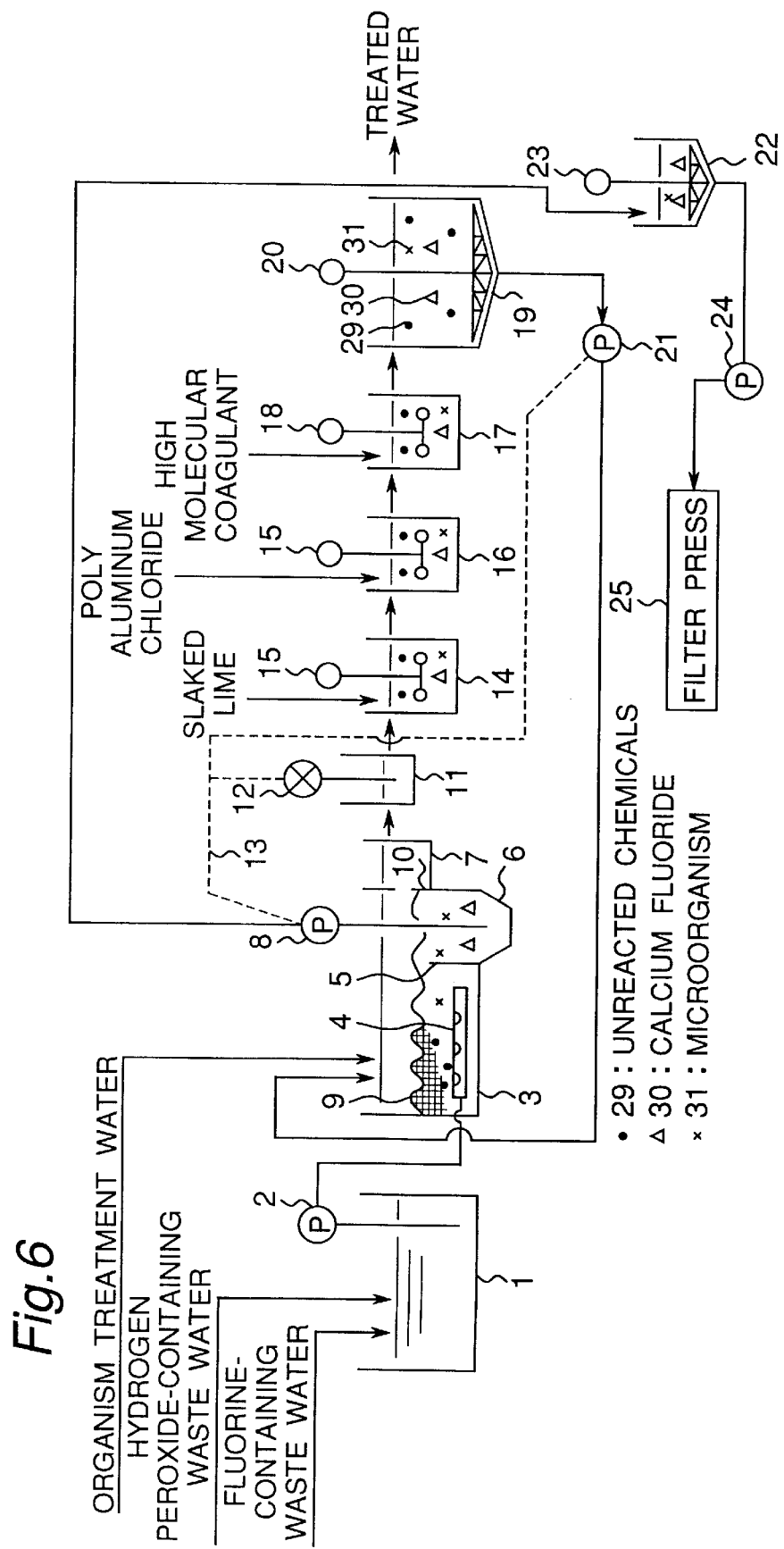

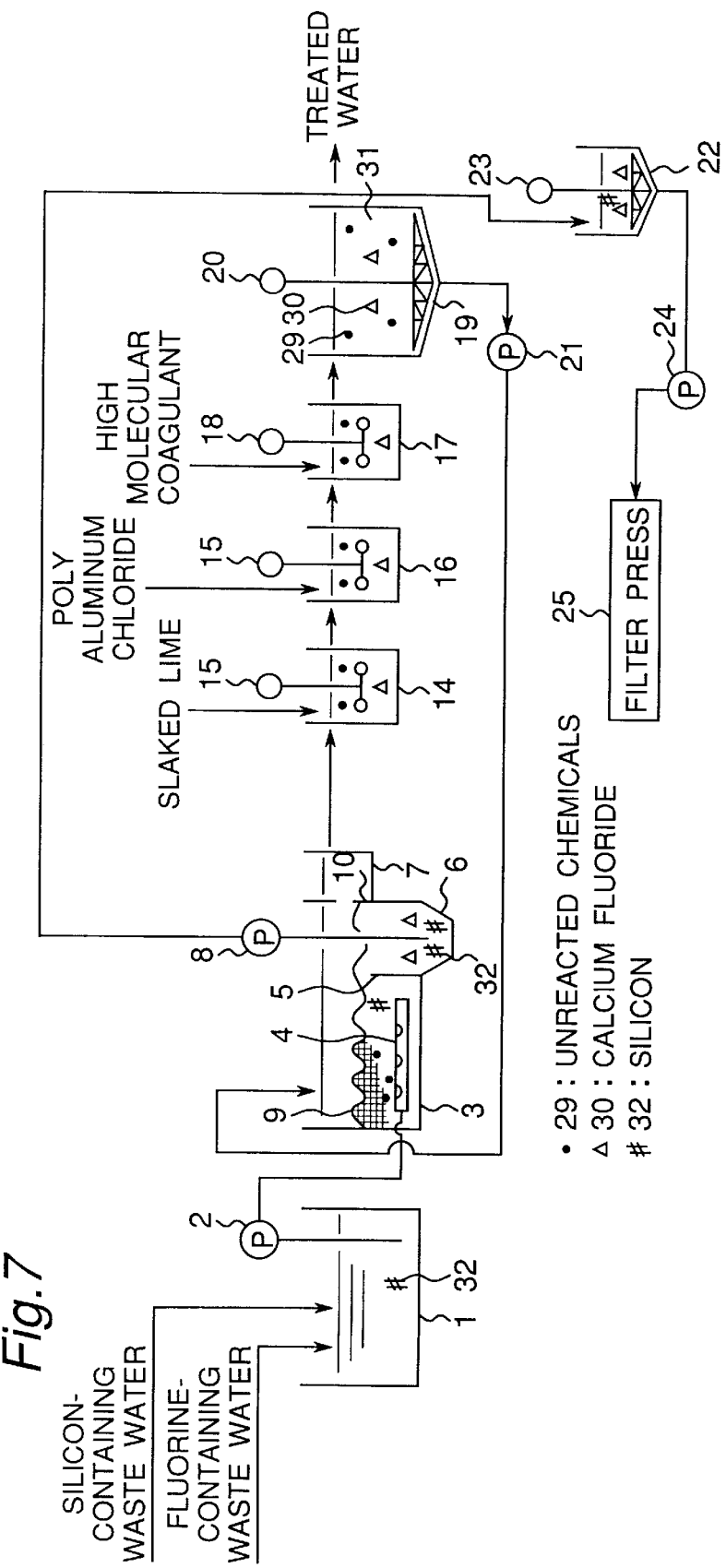

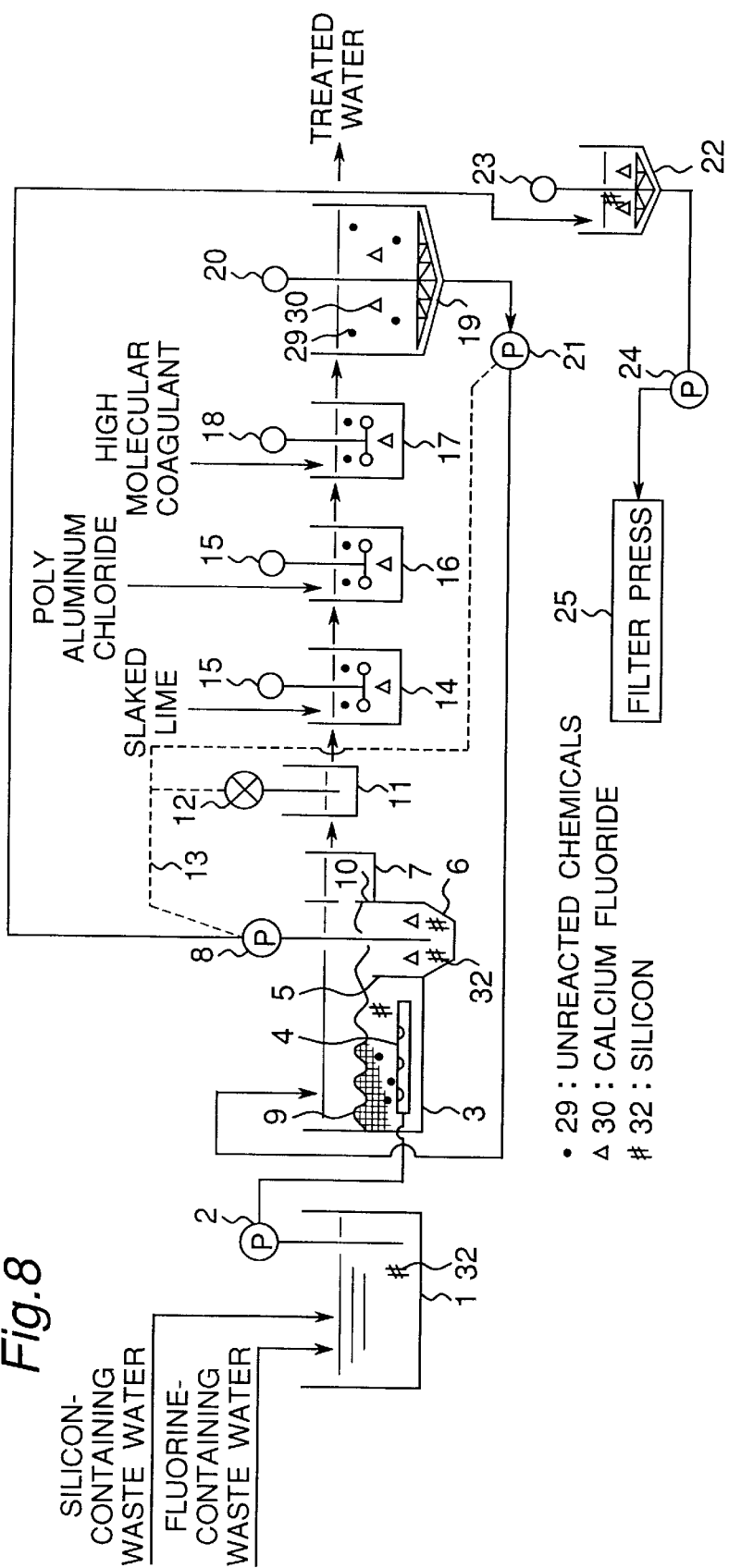

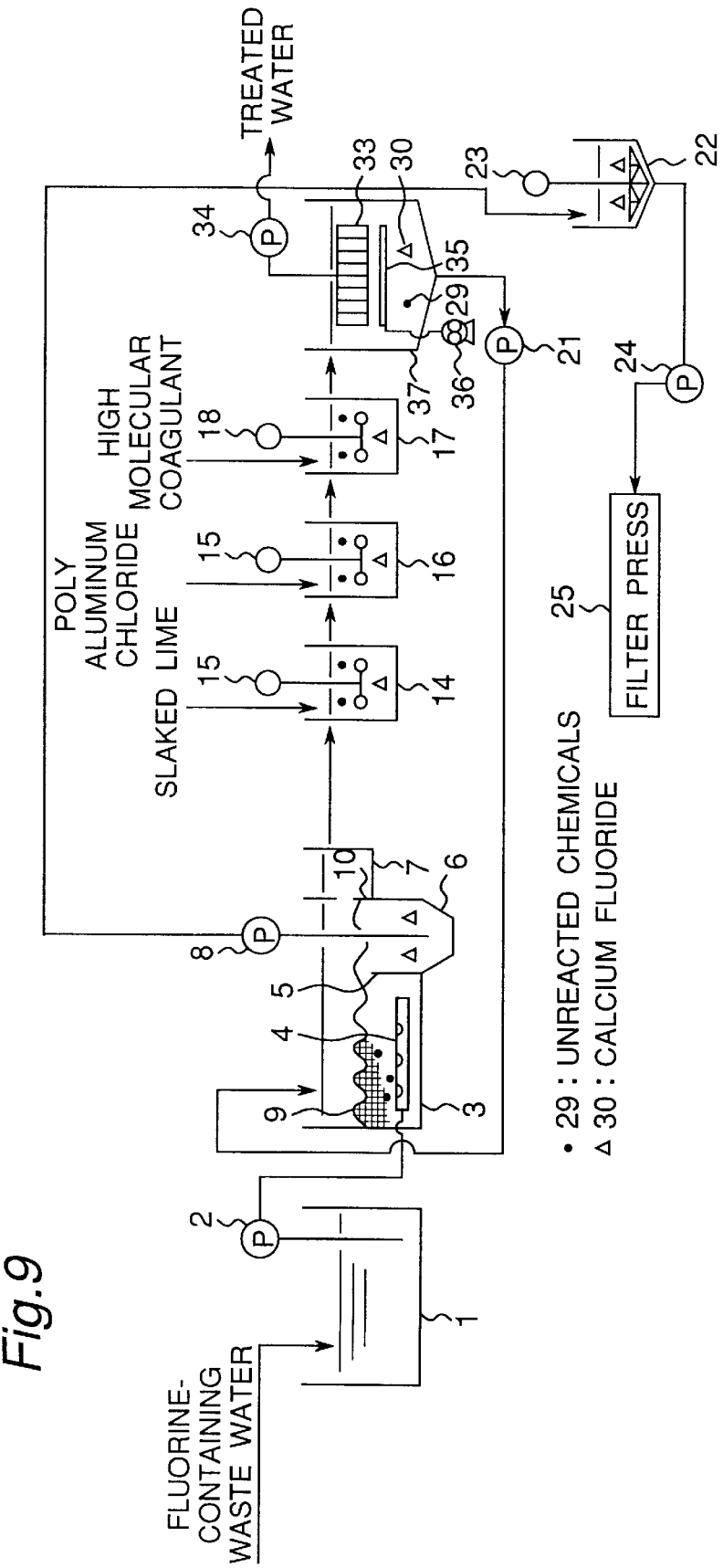

Fig.10A

With normal concentration of fluorine

| TANK | Retention time | Timing (elapsed time) 1hr 2hr 3hr 4hr 5hr 6hr 7hr 8hr 9hr 10hr 11hr 12hr 13hr 14hr 15hr 16hr 17hr 18hr 19hr |
|---|---|---|
| First tank | 2hr | |
| Second tank (Return sludge reaction tank) | 6hr | |
| Fourth tank | 1hr | |
| Fifth tank | 1hr | |
| Sixth tank | 1hr | |
| Seventh tank (SS Separation tank) | 3hr | |
| Eighth tank (Thickening tank) | 5hr | |

Fig.10B

With low concentration of fluorine

| TANK | Retention time | Timing (elapsed time) 1hr–19hr |
|---|---|---|
| First tank | 1hr | 1hr |
| Second tank (Return sludge reaction tank) | 3hr | 2hr–4hr |
| Fourth tank | 20min | ~5hr |
| Fifth tank | 20min | ~6hr |
| Sixth tank | 20min | ~6hr |
| Seventh tank (SS Separation tank) | 3hr | 7hr–10hr |
| Eighth tank (Thickening tank) | 5hr | 10hr–15hr |

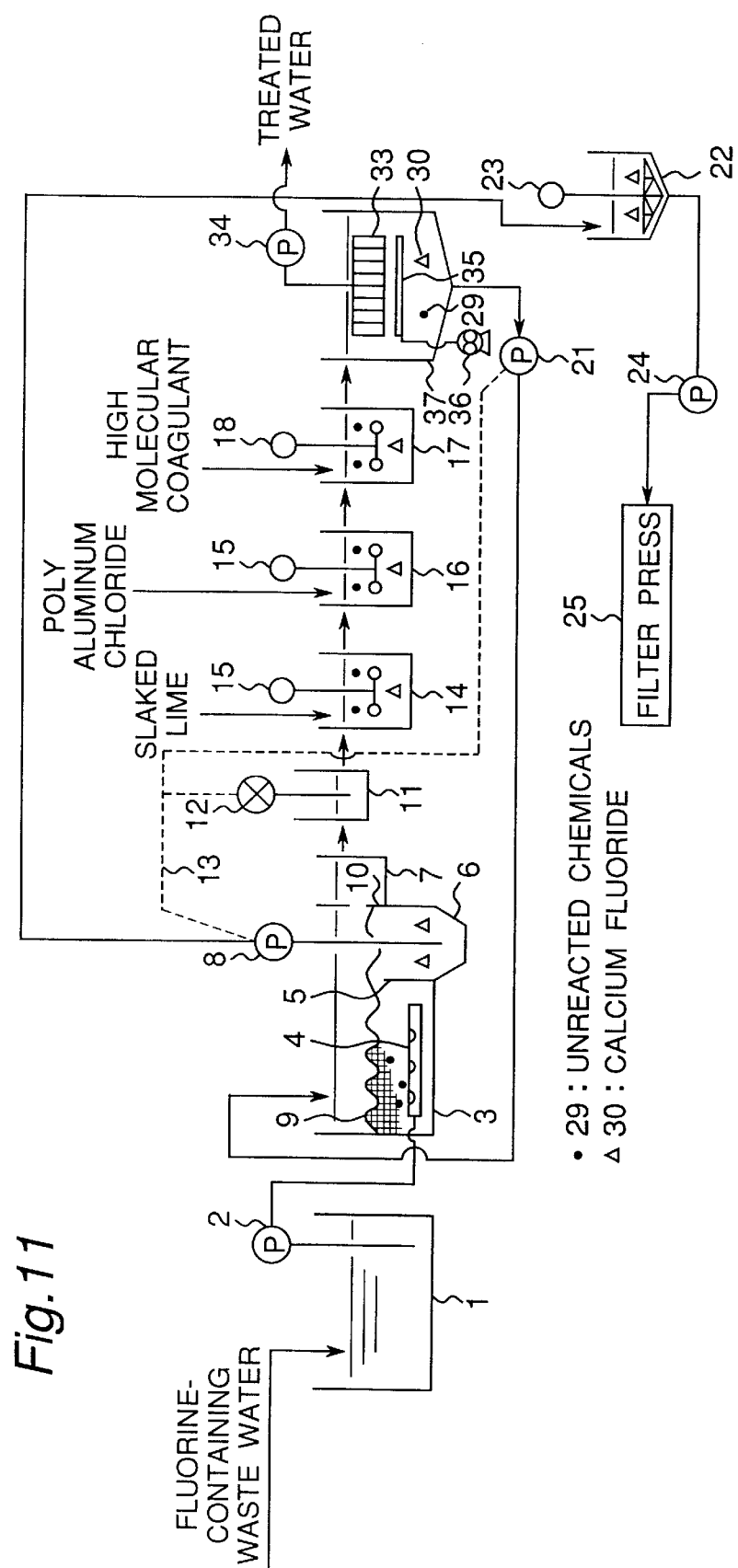

Fig.12A

With normal concentration of fluorine

| TANK | Retention time | Timing (elapsed time) 1hr-19hr |
|---|---|---|
| First tank | 2hr | 1-2hr |
| Second tank (Return sludge reaction tank) | 6hr | 2-8hr |
| Third tank | 20min | ~8hr |
| Fourth tank | 1hr | 9-10hr |
| Fifth tank | 1hr | 10-11hr |
| Sixth tank | 1hr | 11-12hr |
| Seventh tank (SS Separation tank) | 3hr | 12-15hr |
| Eighth tank (Thickening tank) | 5hr | 15-19hr |

Fig. 12B

With low concentration of fluorine

| TANK | Retention time | 1hr | 2hr | 3hr | 4hr | 5hr | 6hr | 7hr | 8hr | 9hr | 10hr | 11hr | 12hr | 13hr | 14hr | 15hr | 16hr | 17hr | 18hr | 19hr |
|---|---|---|---|---|---|---|---|---|---|---|---|---|---|---|---|---|---|---|---|---|
| First tank | 1hr | — | | | | | | | | | | | | | | | | | | |
| Second tank (Return sludge reaction tank) | 3hr | | — | — | — | | | | | | | | | | | | | | | |
| Third tank | 20min | | | | | — | | | | | | | | | | | | | | |
| Fourth tank | 20min | | | | | | — | | | | | | | | | | | | | |
| Fifth tank | 20min | | | | | | | — | | | | | | | | | | | | |
| Sixth tank | 20min | | | | | | | | — | | | | | | | | | | | |
| Seventh tank (SS Separation tank) | 3hr | | | | | | | | — | — | — | | | | | | | | | |
| Eighth tank (Thickening tank) | 5hr | | | | | | | | | | — | — | — | — | — | — | | | | |

WASTE WATER TREATMENT METHOD AND APPARATUS

BACKGROUND OF THE INVENTION

The present invention relates to a waste water treatment method and apparatus for minimizing the amount of sludge generated in a waste water treatment apparatus for treating fluorine-containing waste water discharged from a semiconductor factory.

With reference to FIG. 19, a first prior art is described below. In the first prior art, fluorine-containing waste water is introduced into a raw water tank 101. The fluorine-containing waste water in the raw water tank 101 is transferred, with its quality and amount being adjusted to a slaked lime reaction tank 114 by a first pump 102. In the slaked lime reaction tank 114, fluorine in the waste water reacts with calcium from slaked lime, resulting in calcium fluoride 130.

A quick stirrer 115 serving as a reaction-accelerating stirring means is installed in the slaked lime reaction tank 114 and stirs the waste water. However, the retention time of the waste water in the slaked lime reaction tank 114 is set to less than one hour. Thus, unreacted slaked lime flows out from the slaked lime reaction tank 114 and flows into a poly aluminum chloride coagulating tank 116. A quick stirrer 115 is also installed in the poly aluminum chloride coagulating tank 116. The fine calcium fluoride 130 as a reaction product in the slaked lime reaction tank 114 is coagulated with poly aluminum chloride serving as an inorganic coagulant to form flocs. The unreacted slaked lime is also coagulated with the poly aluminum chloride to form flocs. Because the coagulated floc of slaked lime does not contain calcium ions, the coagulated floc is not effective for treating fluorine. This means nothing else but waste of chemicals and the coagulated floc constitutes the unreacted chemicals 129. The calcium fluoride 130 in floc form becomes a more stable and larger floc in a high molecular coagulating tank 117 to which a high-molecular coagulant is added.

On the other hand, although the unreacted floc 129 of slaked lime is not effective for treating the fluorine, the unreacted floc 129 becomes a more stable and larger floc in the high molecular coagulating tank 117 by addition of the high-molecular coagulant.

The more stable and larger floc of the calcium fluoride 130 and the more stable and larger floc of the slaked lime flow into a settling tank 119 and settle therein. A scraper 120 scrapes the settled flocs to the center of the bottom of the settling tank 119. The flocs become sludge.

That is, the amount of the sludge is the sum of the sludge arising from the calcium fluoride 130 and the unreacted slaked lime as well as the sludge arising from the unreacted coagulant. The sludge scraped to the center of the bottom of the settling tank 119 flows into a thickening tank 122 having a scraper 123 and is thickened therein. Then the sludge is transferred to a filter press 125 by a filter press pump 124 and dehydrated. Because the amount of the sludge generated in the waste water treatment apparatus is large, there are installed two presses 125.

A supernatant liquid of the thickening tank 122 is introduced into the raw water tank 101 through an overflow pipe (not shown).

Meanwhile, a waste water treatment equipment that generates a small amount of dehydrated cake, namely, a small amount sludge is recently required. However, the sludge generated in the waste water treatment equipment of the first prior art contains the sludge of the calcium fluoride and the floc of the unreacted slaked lime. Therefore, a large amount of sludge is generated in the waste water treatment equipment of the first prior art. Varying in accordance with conditions of waste water discharged from factories, the amount of the sludge of the unreacted slaked lime is generally more than twice as large as that of the sludge of the calcium fluoride.

(Second Prior Art)

The second prior art is shown in FIG. 20. The second prior art differs from the first prior art in that a part of the sludge discharged from the settling tank 119 of the first prior art is returned to the raw water tank 101 by a sludge return pump 121.

Because in the second prior art, a part of the sludge discharged from the settling tank 119 is returned to the raw water tank 101, sludge containing the unreacted chemicals is consumed by the fluorine-containing waste water. Therefore, the amount of the sludge generated in the waste water treatment apparatus of the second prior art is smaller than that generated in the waste water treatment apparatus of the first prior art shown in FIG. 19.

(Third Prior Art)

FIG. 21 shows the third prior art. The third prior art differs from the first prior art in that a part of the sludge discharged from the settling tank 119 is returned to the slaked lime reaction tank 114 by the sludge return pump 121. Because in the third prior art, a part of the sludge discharged from the settling tank 119 is returned to the slaked lime reaction tank 114, the sludge containing the unreacted chemicals is consumed by the fluorine-containing waste water. Therefore, the amount of the sludge generated in the waste water treatment apparatus of the third prior art is smaller than that generated in the waste water treatment apparatus of the first prior art.

(Reference Example)

FIG. 22 shows a reference example. In the reference example, the fluorine-containing waste water is introduced into the raw water tank 101. The first pump 102 transfers the fluorine-containing waste water in the raw water tank 101, with quality and amount of the water being adjusted, to a reaction tank 126.

The fluorine-containing waste water is introduced into the reaction tank 126 at the lower portion of an anaerobic sludge zone 109 through a lower inflow pipe 104.

Both the fluorine-containing waste water and the sludge containing the unreacted chemicals (sum of unreacted slaked lime and unreacted coagulant) 129 returned by the pump 121 from the settling tank 119 are introduced into the reaction tank 126. Therefore, in the reaction tank 126, the anaerobic sludge zone 109 is always formed.

In the reaction tank 126, fluorine contained in the fluorine-containing waste water and calcium contained in the unreacted chemicals 129 react with each other to form calcium fluoride 130. That is, the calcium is recycled, which contributes to reduction of the amount of generated sludge.

Thus, the amount of the sludge generated in the waste water treatment apparatus of the reference example is smaller than that generated in the waste water treatment apparatus of the first prior art, but is not sufficient.

The amount of sludge generated in the waste water treatment apparatus of the reference example is smaller than that of sludge generated by the waste water treatment apparatus of the first prior art. Because in the reference example, the fluorine-containing waste water in the reaction tank 126 is not aerated, the calcium fluoride 130 settles. In the reaction tank 126, the amount of the settled calcium fluoride 130 increases with the elapse of time. Thus the height of the anaerobic sludge zone 109 increases. As a result, the calcium fluoride 130 and the treatment water (waste water) flow into the slaked lime reaction tank 114.

In the slaked lime reaction tank 114, unreacted fluorine in the waste water reacts with calcium arising from added slaked lime to form calcium fluoride 130. However, all calcium does not form the calcium fluoride 130 but unreacted calcium, namely, unreacted slaked lime is also present.

A phenomenon to which attention should be paid occurs in the slaked lime reaction tank 114. That is, when a large amount of the calcium fluoride 130 discharged from the reaction tank 126 flows into the slaked lime reaction tank 114 and thus the concentration of the sludge rises, the neutralizing action of the alkaline slaked lime becomes weak. Therefore, there occurs a phenomenon that a large amount of the slaked lime is added to the slaked lime reaction tank 114.

The quick stirrer 115 serving as a stirring means for accelerating reaction is installed in the slaked lime reaction tank 114 to stir the waste water. But because the retention time of the waste water in the slaked lime reaction tank 114 is less than one hour and because the neutralizing action of the slaked lime becomes weak, the unreacted slaked lime increases and flows out from the slaked lime reaction tank 114 and flows into the succeeding poly aluminum chloride coagulating tank 116. The unreacted slaked lime and unreacted coagulant form the unreacted chemicals 129.

A quick stirrer 115 is also installed in the poly aluminum chloride coagulating tank 116. The fine calcium fluoride 130 generated by the reaction in the slaked lime reaction tank 114 is coagulated with the poly aluminum chloride serving as an inorganic coagulant to form flocs. The unreacted slaked lime is also coagulated with the poly aluminum chloride to form flocs. The coagulated floc of slaked lime is not effective for treating fluorine. This means nothing else but waste of chemicals and the coagulated floc constitutes the unreacted chemicals 129.

The calcium fluoride 130 in floc form becomes a more stable and larger floc in the high molecular coagulating tank 117 to which a high-molecular coagulant is added. The unreacted floc arising from the slaked lime is not effective for treating the fluorine. The unreacted floc becomes a more stable and larger floc in the high molecular coagulant tank 117 to which the high-molecular coagulant is added. The more stable and larger floc of the calcium fluoride 130 and the more stable and larger floc of the slaked lime flow into the settling tank 119 and settle therein. A scraper 120 scrapes the settled flocs to the center of the bottom of the settling tank 119. The scraped flocs become sludge. The amount of the scraped sludge is the sum of the sludge of the calcium fluoride 130 and the unreacted slaked lime. A part of the sludge scraped to the center of the bottom of the settling tank 119 is returned to the reaction tank 126 by the sludge return pump 121 to recycle the unreacted chemicals (unreacted slaked lime and unreacted coagulant) 129. Thus, the amount of the sludge generated in the waste water treatment apparatus of the reference example is smaller than that of the sludge generated in the waste water treatment apparatus of the first prior art shown in FIG. 19. The sludge arising from a part of the calcium fluoride 130 and that arising from the unreacted slaked lime flow into the thickening tank 122 having a scraper 123 and is thickened therein. Then the sludge is transferred to the filter press 125 by the filter press pump 124 and dehydrated.

The supernatant liquid of the thickening tank 122 is introduced into the raw water tank 101 through an overflow pipe (not shown).

The amount of the sludge generated in the waste water treatment apparatus of the reference example is smaller than that of the first prior art. However, the sludge generated in the settling tank 119 of the waste water treatment apparatus of the reference example contains the sludge of the calcium fluoride 130 and the unreacted chemicals. Therefore, it cannot be said that the amount of the sludge generated in the waste water treatment apparatus of the reference example is reduced sufficiently. That is, the sludge arising from the unreacted chemicals is introduced into the thickening tank 122 and thickened and subsequently dehydrated by the filter press 125 to form sludge in the waste water treatment apparatus of the reference example.

As another prior art, "method of treating waste water containing fluorine ions and hydrogen peroxide" is disclosed in Japanese Patent Laid-Open Publication No. 6-86988. According to the prior art method, slaked lime that is an alkaline calcium compound is added to waste water containing fluorine ions and hydrogen peroxide to form the fluorine ions into calcium fluoride, anion high-molecular coagulant is added to the waste water to generate fine flocs, and catalase is added thereto to decompose the hydrogen peroxide after the solid and the liquid are separated from each other. The prior art has a problem that the waste water treatment apparatus generates a large amount of sludge because the sludge discharged from the settling tank contains unreacted chemicals and has another problem that the running cost is high because catalase is added to the waste water to decompose the hydrogen peroxide contained therein.

As described above, fluorine contained in the waste water is generally treated by using inorganic coagulants such as slaked lime and poly aluminum chloride, and high-molecular coagulant. However, flocs (sludge) arising from the unreacted chemicals are generated inevitably in the reaction tank, leading to increase in the amount of the sludge generated in the waste water treatment apparatus.

The following is the reason for the generation of the floc, namely, the sludge arising from the unreacted chemicals:

i) Because it is difficult to construct a very large reaction tank in view of construction fee, the retention time of the waste water in the reaction tank is short. Thus, a complete reaction of the following chemical equation cannot be achieved.

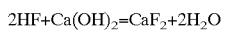

$$2HF + Ca(OH)_2 = CaF_2 + 2H_2O$$

Specifically, in reaction tanks of ordinary waste water treatment apparatuses, the reaction expressed following formula takes place to form not only the calcium fluoride sludge but also the slaked lime sludge arising from the floc of the unreacted slaked lime.

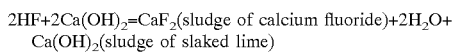

$$2HF + 2Ca(OH)_2 = CaF_2(\text{sludge of calcium fluoride}) + 2H_2O + Ca(OH)_2(\text{sludge of slaked lime})$$

The sludge of the slaked lime functions as chemicals when the calcium ions are disolved from the slaked lime by an acid. Thus, it is preferable to recycle it.

ii) To reduce the concentration of fluorine contained in waste water to less than 15 ppm, it is necessary to add slaked lime (as calcium) in an amount larger than that of the fluorine to the waste water. This is based on experiences in the treatment of the waste water. Thus, practically, an excess amount of slaked lime is added to the waste water to reduce the concentration of the fluorine contained therein to less than 15 ppm.

It is conceivable that a sludge return pipe is additionally installed on the settling tank 119 of the waste water treatment apparatus of the first prior art shown in FIG. 19 to return the settled sludge (including unreacted chemicals) of the settling tank 119 to the raw water tank 101 and the slaked lime reaction tank 114. Thereby, the unreacted chemicals is recycled.

Further, in the waste water treatment of the second prior art shown in FIG. 20, a part of the sludge (including unreacted chemicals) discharged from the settling tank 119 is returned to the raw water tank 101 by the sludge return pump 121. In the waste water treatment of the third prior art shown in FIG. 21, a part of the sludge (including unreacted chemicals) discharged from the settling tank 119 is returned to the slaked lime reaction tank 114 by the sludge return pump 121. In both waste water treatment, the concentration (sum of concentration of calcium fluoride sludge and that of slaked lime sludge) of the sludge rises in both waste water treatment systems with the elapse of time. The rise of sludge concentration has not been considered a serious problem. But the driving of the apparatuses revealed that the consumption amount of the slaked lime increases remarkably in the slaked lime reaction tank 114 when the sludge concentration is high. Although in both apparatuses, the unreacted slaked lime is returned to the raw water tank 101 and the slaked lime reaction tank 114 as the unreacted chemicals to be recycled, it has been found that the consumption amount of added slaked lime increases when the concentration of the sludge in the slaked lime reaction tank 114 increases to more than 1000 ppm. As reason for the increase of the consumption amount of the slaked lime is as follows. That is, when the concentration of the sludge is high, the effect (effect for increasing PH, specifically, the effect of making fluorine-containing waste water of PH 2–3 neutral or weak alkaline) of the slaked lime is offset and thus the consumption amount of the slaked lime increases. That is, the effect of the slaked lime for increasing PH is canceled by the buffering action of the sludge. The method adding the slaked lime to the slaked lime reaction tank 114 is controlled generally according to a set PH value by means of ON-OFF control or proportional control.

The buffering action is, for example, a phenomenon in which supposing that when 1 g of slaked lime is added to a certain amount of city water, the PH of the solution has become 10, whereas when 1 g of slaked lime is added to the same amount of waste water containing sludge (concentration of sludge: 1000 ppm), the PH of the solution does not become 10, but 8.5. When the PH of the waste water is set to 10, only 1 g of slaked lime is required for the city water, whereas a large amount of the slaked lime is required for the waste water containing much sludge.

In the waste water treatment apparatus of the reference example shown in FIG. 22, so long as the sludge is removed from the settling tank 119 to the thickening tank 122, it is impossible to make the unreacted chemicals zero. To make the unreacted chemicals zero, it is necessary to improve the waste water treatment system as a whole. That is, required are a tank and a system that complies with a new purpose, i.e., that recycles all sludge containing unreacted chemicals and keeps the function and performance of the waste water treatment equipment normal.

SUMMARY OF THE INVENTION

Therefore, it is an object of the present invention to provide a waste water treatment method and a waste water treatment apparatus capable of achieving energy saving, reduction of sludge, and reduction of chemical consumption.

To achieve the object, it is desirable that tanks of the waste water treatment apparatus have the following contents i), ii), and iii) in their functions.

i) Fluorine-containing waste water and sludge containing unreacted chemicals react with each other efficiently.

Specifically, the amount of the unreacted chemicals, i.e., slaked lime in this case, becomes zero when a waste water treatment system is so constructed that the amount of an acid contained in the fluorine-containing waste water is larger than the amount of an alkali (amount of slaked lime) contained in the unreacted chemicals. More specifically, when the measured PH of the sludge is less than 7, the amount of the unreacted chemicals (amount of slaked lime) becomes zero. When unreacted slaked lime is present, the sludge indicates alkaline. A required waste water treatment apparatus has a supernatant liquid measuring tank succeeding to a return sludge reaction tank to control the PH thereof.

ii) A reaction product can be easily separated from waste water and discharged from the waste water treatment system.

Specifically, the waste water treatment apparatus is required to allow sludge which has become acidic to be removed therefrom.

iii) It is necessary to provide a waste water treatment system that can control the concentration of sludge in a slaked lime reaction tank and optimize the concentration of sludge when it has risen over an optimum concentration. More specifically, it is necessary to provide the waste water treatment apparatus with a suspended solid (SS) densitometer. If the waste water treatment apparatus satisfies the contents i), ii), and iii) in its function, it can recycle the unreacted chemicals and prevent an excess consumption of chemicals due to high concentration of sludge.

In order to achieve the object, there is provided a waste water treatment method comprising the steps of:

introducing fluorine-containing waste water from a return sludge reaction tank having a settling section at its rear portion into a settling tank located at a succeeding stage of the return sludge reaction tank; and introducing sludge which has settled in the settling tank into the return sludge reaction tank.

Also, there is provided a waste water treatment apparatus comprising:

a return sludge reaction tank into which fluorine-containing waste water is introduced and which has a settling section at its rear portion;

a settling tank located at a succeeding stage of the return sludge reaction tank; and a sludge return means for returning sludge settled in the settling tank to the return sludge reaction tank.

In the waste water treatment method and the waste water treatment apparatus of the present invention, unreacted chemical-containing sludge settled in the settling tank is introduced into the return sludge reaction tank having the settling section located at its rear portion. Therefore, in the return sludge reaction tank, the unreacted chemicals and the fluorine-containing waste water can react with each other. Further, it is possible to settle the reaction product of the unreacted chemicals and the fluorine-containing waste water in the settling section located at the rear portion of the return sludge reaction tank.

Further, all sludge in the settling tank is introduced into the return sludge reaction tank. Therefore, unlike the conventional waste water treatment apparatus, unreacted chemical-containing sludge discharged from the settling tank is not introduced into the succeeding thickening tank.

In one embodiment of the present invention, a sludge carrying out means is installed in the settling section of the return sludge reaction tank.

In the embodiment, the sludge carrying out means is installed in the settling section of the return sludge reaction tank. Thus, the sludge carrying out means can carry reacted sludge which has settled in the settling section of the return sludge reaction tank out of the waste water treatment system. Therefore, it is possible to remove the reacted sludge from a specific reaction tank (return sludge reaction tank) of the waste water treatment apparatus reliably.

In one embodiment of the present invention, said return sludge reaction tank has a reaction section, the settling section, and a supernatant section located sequentially from a front portion of the return sludge reaction tank.

In the embodiment, the return sludge reaction tank further has the settling section. Thus, it is possible to settle sludge included in the floc sludge-containing waste water at the settling section and allow a supernatant liquid to be present at the supernatant section. That is, because the return sludge reaction tank further has the settling section and the supernatant section, it is possible to separate the sludge-containing waste water into the supernatant and the sludge.

In one embodiment of the present invention, said sludge carrying out means consists of a pump.

In the embodiment, because the return sludge reaction tank further has the pump installed thereon, sludge can be easily carried out of the return sludge reaction tank. Further, because the pump is a wide-use product, it can be easily installed on the waste water treatment apparatus. Furthermore, the carrying out amount of the sludge can be easily varied by adjusting the drive time period of the pump.

Also, there is provided a waste water treatment apparatus for treating fluorine-containing waste water by sequentially introducing said fluorine-containing waste water into a return sludge reaction tank having a settling section in its rear portion, a supernatant measurement tank having a measuring instrument, a reaction tank, a coagulating tank, and a settling tank and returning an entire amount of sludge settled in the settling tank to the return sludge reaction tank by means of a sludge return pump.

In the waste water treatment apparatus, it is possible to allow sludge containing unreacted chemicals and the fluorine-containing waste water to react with each other in the return sludge reaction tank. Then, in the supernatant measurement tank, the supernatant liquid quality can be measured. Also, in the reaction tank, it is possible to allow the fluorine-containing waste water and chemicals (slaked lime) to react with each other. Then, using coagulants (poly aluminum chloride and high-molecular coagulant) in the coagulating tank, it is possible to coagulate reaction products in the waste water derived from the reaction tank. Thereafter, in the settling tank, it is possible to separate the waste water derived from the coagulating tank into the supernatant and precipitate. Further, an entire amount of unreacted chemical-containing sludge which has settled in the settlement tank to the return sludge reaction tank. Thus, the unreacted chemicals can be recycled.

In one embodiment of the present invention, the apparatus further provided with a sludge carrying out means installed on the settling section of the return sludge reaction tank and a sludge return pump installed on the settling tank, wherein carrying-out amount of the sludge carrying out means and discharge amount of the sludge return pump are controlled by an inverter according to a measured result of the measuring instrument.

In the waste water treatment apparatus, the water quality of the supernatant measurement tank is measured by the measuring instrument. Based on a measured result, the sludge carrying out means is controlled. Therefore, it is possible to properly keep the water quality (sludge concentration=SS (suspended solid concentration)) of not only the supernatant measurement tank but also other tanks and further the entire waste water equipment. Thus, the entire waste water equipment can be maintained appropriately.

In one embodiment of the present invention said measuring instrument of the supernatant measurement tank consists of a suspended solid densitometer.

Because in the waste water treatment apparatus, the measuring instrument of the supernatant measurement tank consists of the SS (suspended solid) concentration meter, it is possible to properly keep the SS concentration (sludge concentration) not only of the supernatant measurement tank but also of the entire waste water equipment. Therefore, it is possible to prevent a excessive addition of slaked lime that occurs when the SS concentration is higher than a proper concentration. If the excessive addition of slaked lime occurs, the SS concentration of the entire waste water equipment rises. As a result, for example, a scraper of the settling tank stops due to a excessively applied torque.

In one embodiment of the present invention, said measuring instrument of the supernatant measurement tank consists of a PH meter.

In the embodiment, the measuring instrument of the supernatant measurement tank consists of the PH meter. Therefore, it is possible to measure the PH of the liquid in the supernatant measurement tank and add proper amount of slaked lime corresponding to an acidity indicated by the fluorine concentration of the waste water.

In one embodiment of the present invention, said measuring instrument of the supernatant measurement tank consists of a suspended solid meter and a PH meter.

Because in the embodiment, the supernatant liquid measurement tank has both the suspended solid meter and the PH meter as the measuring instrument thereof, it is possible to measure both the SS concentration and PH of the liquid in the supernatant measurement tank. If the SS concentration or the PH exceeds a predetermined value, the sludge carrying out means is operated to keep the entire waste water treatment equipment properly.

The main role of the SS concentration meter is to properly maintain the SS concentration not only of the liquid in the supernatant measurement tank, but also of the entire waste water treatment equipment. The main role of the PH meter is to properly maintain the PH of the liquid not only of the supernatant liquid measurement tank, but also of the entire waste water treatment equipment. It can be determined by the PH of the supernatant measurement tank whether the unreacted slaked lime contained in the returned sludge from the settling tank has been consumed in the return sludge reaction tank.

In addition, if the SS concentration of the liquid in the supernatant measurement tank is more than 1000 ppm, slaked lime does not have its alkaline effect. In that case, the sludge carrying out means is operated to extract (take out) sludge from the entire waste water treatment equipment and keep the SS concentration less than 1000 ppm. If the PH of the liquid in the supernatant measurement tank is less than seven, the fluorine-containing waste water and unreacted slaked lime contained in the returned sludge react with each other completely. As a result, the alkaline unreacted slaked lime is hardly present in the returned sludge. That is, the returned sludge consists of calcium fluoride derived only from the reaction. At this time, the sludge carrying out means is operated to extract the sludge from the entire waste water treatment equipment.

Also, there is provided a waste water treatment apparatus for treating fluorine-containing waste water by sequentially introducing said fluorine-containing waste water into a return sludge reaction tank having a settling section in its rear portion, a supernatant measurement tank having a measuring instrument, a reaction tank, a coagulating tank, and a suspended solid separation tank and returning an entire amount of sludge settled in the suspended solid separation tank to the return sludge reaction tank by means of a sludge return pump.

In the embodiment, the SS (suspended solid) separation tank is provided instead of the settling tank. Therefore, it is possible to reliably separate the waste water into a solid such as flocs (consisting of SS) and clean water (water without SS). That is, it is possible to obtain treated water not containing SS at all.

In one embodiment of the present invention, a film separation device is installed in the suspended solid separation tank.

In the embodiment, the film separation device is installed in the suspended solid separation tank. Therefore, it is possible to separate a calcium fluoride floc and a floc arising from unreacted chemicals from the waste water by a physical method. Thereby, treated water of high quality can be obtained.

The film separation device is constructed of a reverse osmosis film (RO), a micro filter film (MF) or an ultra filter film (UF).

In one embodiment of the present invention, the film separation device is constructed of a submerged film.

In the embodiment, the film separation device is constructed of the submerged film. Thus, the submerged film can be installed in the liquid of the SS separation tank and unnecessary to proved new installation space for the submerged film. That is, the waste water treatment apparatus can be constructed in a small space. The submerged film generally means a film separation device submerged in the water.

In one embodiment of the present invention, said submerged film consists of an ultra filter film or a micro filter film.

In the embodiment, the submerged film consists of the ultra filter film or the micro filter film. Thus, it is possible to separate the waste water into SS (suspended solid) having a size of a micrometer order. That is, the submerged film serves as a means for improving the quality of treated water. Because various kinds of ultra filter films and micro filter films are commercially available, the waste water treatment apparatus can be constructed easily. The ultra filter film or the micro filter film can filter SS (suspended solid) having a size of a micrometer order. The ultra filter film is higher than the micro filter film in filtering accuracy.

In one embodiment of the present invention, an aeration device is installed below the submerged film.

In the embodiment, the aeration device is installed below the submerged film. Thus, the surface of the submerged film can be cleaned easily by aeration to prevent the submerged film from being choked with a suspended solid. The submerged film can be driven without being choked with a fine suspended solid (SS) by aeration.

Also, there is provided a waste water treatment apparatus for treating fluorine-containing waste water by sequentially introducing said fluorine-containing waste water into a return sludge reaction tank having a settling section in its rear portion, a supernatant measurement tank having a measuring instrument, a reaction tank, a coagulating tank, and a settling tank, and introducing sludge generated in said return sludge reaction tank into a thickening tank, and dehydrating said sludge in a succeeding stage of the thickening tank.

In the treatment process of the embodiment, the fluorine-containing waste water is sequentially introduced into the return sludge reaction tank having the settling section in its rear portion, the supernatant measurement tank, the reaction tank, the coagulating tank, and the settling tank. Thereafter, only sludge generated in the return sludge reaction tank is introduced into the thickening tank and dehydrated. Accordingly, it is possible to reduce the amount of sludge generated in the waste water treatment equipment without dehydrating sludge containing unreacted chemicals. In the return sludge reaction tank, the unreacted chemicals contained in the returned sludge is entirely treated reliably with the fluorine-containing waste water. Therefore, sludge consisting of the unreacted chemicals is eliminated.

Also, there is provided a waste water treatment apparatus for treating fluorine-containing waste water by sequentially introducing said fluorine-containing waste water into a return sludge reaction tank having a settling section in its rear portion, a supernatant measurement tank having a measuring instrument, a reaction tank, a coagulating tank, and a suspended solid separation tank, introducing only sludge generated in said return sludge reaction tank into a thickening tank, and dehydrating said sludge in a succeeding stage of the thickening tank.

In the treatment process of the embodiment, the fluorine-containing waste water is sequentially introduced into the return sludge reaction tank having the settling section in its rear portion, the supernatant measurement tank, the reaction tank, the coagulating tank, and the SS separation tank. Thereafter, only sludge generated in the return sludge reaction tank is introduced into the concentration tank and dehydrated. Accordingly, it is possible to reduce the amount of sludge generated in the waste water treatment equipment without dehydrating sludge containing unreacted chemicals. In the return sludge reaction tank, the unreacted chemicals contained in the returned sludge is entirely treated reliably with the fluorine-containing waste water. Therefore, sludge consisting of the unreacted chemicals is eliminated. Further, treated water can be securely obtained from the SS separation tank. Thus, unlike the conventional settling tank from which the SS (suspended solid) often flows out, it is possible to obtain treated water free from SS without SS flow-out.

In one embodiment of the present invention, said fluorine-containing waste water contains an organic matter;

hydrogen peroxide-containing waste water is introduced into a raw water tank located at a preceding stage of the return sludge reaction tank, in addition to the organic matter- and fluorine-containing waste water; and organism treatment water is introduced into said return sludge reaction tank.

In the embodiment, the fluorine-containing waste water containing also an organic matter, and hydrogen peroxide-containing waste water are introduced into the raw water tank. Organism treatment water is introduced into the return sludge reaction tank (second tank). Accordingly, the acidic fluorine-containing waste water is neutralized in the return sludge reaction tank. The organism treatment water is also introduced into the return sludge reaction tank. Therefore, microorganisms in the organism treatment water propagate with organic matters in the fluorine-containing waste water as a nutrient. In particular, because anaerobic microorganisms having propagated have a reducing property, they can reduce the hydrogen peroxide contained in the waste water.

Also, there is provided a waste water treatment method, comprising steps of sequentially introducing said fluorine-containing waste water into a return sludge reaction tank having a settling section in its rear portion, a supernatant measurement tank having a measuring instrument, a reaction tank, a coagulating tank, and a suspended solid separation tank; introducing only sludge generated in said return sludge reaction tank into a thickening tank; and dehydrating said sludge in a succeeding stage of the thickening tank, wherein said fluorine-containing waste water contains an organic matter;

hydrogen peroxide-containing waste water and said organic matter- and fluorine-containing waste water are introduced into a raw water tank located at a preceding stage of the return sludge reaction tank; and organism treatment water is introduced into said return sludge reaction tank.

In the waste water treatment method of the present invention, the fluorine-containing waste water containing also an organic matter, and hydrogen peroxide-containing waste water are introduced into the raw water tank. Organism treatment water is introduced into the return sludge reaction tank (second tank). Accordingly, the acidic fluorine-containing waste water is neutralized in the return sludge reaction tank. The organism treatment water is also introduced into the return sludge reaction tank. Therefore, microorganisms in the organism treatment water propagate with organic matters in the fluorine-containing waste water as a nutrient. In particular, because anaerobic microorganisms having propagated have a reducing property, they can reduce the hydrogen peroxide contained in the waste water.

Also, there is provided a waste water treatment method, comprising steps of sequentially introducing said fluorine-containing waste water into a return sludge reaction tank having a settling section in its rear portion, a supernatant measurement tank having a measuring instrument, a reaction tank, a coagulating tank, and a settling tank, and introducing sludge generated in said return sludge reaction tank into a thickening tank, and dehydrating said sludge in a seccessing stage of the thickening tank, wherein said fluorine-containing waste water and silicon-containing waste water are introduced into a raw water tank located at a preceeding stage of the return sludge reaction tank.

In the waste water treatment method, fluorine-containing waste water and silicon-containing waste water are introduced into the raw water tank, and the both waste waters are mixed together. Silicon particles contained in the silicon-containing waste water have a property of improving settling performance of floc sludge, thus contributing to the improvement of the settling performance of floc sludge consisting of calcium fluoride in the return sludge reaction tank (silicon particles constitute the nucleus of floc and consequently improve the settling performance of sludge consisting of aggregated of flocs).

The aggregation of flocs consisting of the calcium fluoride forms sludge having an improved settling performance. Owing to this, the anaerobic sludge zone of the return sludge reaction tank can be formed as a firm sludge zone. Consequently, when the fluorine-containing waste water is introduced into the return sludge reaction tank from its lower portion, the sludge of the anaerobic sludge zone is hardly raised by the stream of the fluorine-containing waste water. Thus, the return sludge reaction tank maintains favorable treating performance. That is, fluorine contained in the waste water is treated under a good condition that the waste water does not pass through a short cut hole which might be formed through the anaerobic sludge zone by raising-away of sludge.

Also, there is provided a waste water treatment method, comprising steps of sequentially introducing said fluorine-containing waste water into a return sludge reaction tank having a settling section in its rear portion, a supernatant measurement tank having a measuring instrument, a reaction tank, a coagulating tank, and a suspended solid separation tank; introducing only sludge generated in said return sludge reaction tank into a thickening tank; and dehydrating said sludge, wherein said fluorine-containing waste water and silicon-containing waste water are introduced into a raw water tank located at a preceeding stage of the return sludge reaction tank.

In the waste water treatment method, fluorine-containing waste water and silicon-containing waste water are introduced into the raw water tank and both the waste waters are mixed together. Silicon particles contained in the silicon-containing waste water have a property of improving settling performance of floc sludge, thus contributing to the improvement of the settling performance of floc sludge consisting of calcium fluoride in the return sludge reaction tank (silicon particles constitute the nucleus of floc and consequently improve the settling performance of sludge consisting of aggregated flocs).

The aggregated flocs consisting of calcium fluoride forms sludge having an improved settling property. Owing to this, the anaerobic sludge zone of the return sludge reaction tank can be formed as a firm sludge zone. Consequently, when the fluorine-containing waste water is introduced into the return sludge reaction tank from its lower portion, the sludge of the anaerobic sludge zone is hardly raised by the stream of the fluorine-containing waste water. Thus, the return sludge reaction tank maintains favorable treating performance.

Further, because the SS (suspended solid) separation tank is provided, it is possible to obtain treated water, free from SS.

Also, there is provided a waste water treatment apparatus comprising:

a first treatment system in which fluorine-containing waste water is sequentially introduced into a return sludge reaction tank having a settling section in its rear portion, a supernatant measurement tank having a measuring instrument, a reaction tank, a coagulating tank, and a settling tank; and a second treatment system in which fluorine-containing waste water is sequentially introduced into a return sludge reaction tank having a settling section in its rear portion, a supernatant measurement tank having a measuring instrument, a reaction tank, a coagulating tank, and a suspended solid separation tank, wherein said fluorine-containing waste water is treated by said first and second treatment systems arranged in parallel with each other, and sludge generated in said return sludge reaction tank is introduced into a thickening tank and dehydrated by means of a dehydrator.

In the waste water treatment apparatus, waste water is introduced into two treatment systems arranged in parallel with each other. Therefore, it is possible to adjustably mix low-quality water, which is treated by the first treatment system having the settlement tank with high-quality water, which is treated by the second treatment system having the SS separation tank yielding high-quality treated water. The reason why the second treatment system with the SS separation tank yields treated water of higher quality than the first treatment system is that flocs may flow out from the settling tank of the first treatment system, leading to the water quality deterioration. On the other hand, in the SS separation tank of the second treatment system, flocs are separated from the waste water physically, which prevents the flow-out of the flocs. Therefore, the treated water quality of the second treatment system is kept high and stable without any SS flow-out.

In both the first and second treatment systems, only sludge generated in the return sludge reaction tank is introduced into the thickening tank and then dehydrated, sludge not containing unreacted chemicals is dehydrated. Therefore, the amount of sludge generated by the method of the invention is smaller than that generated by the conventional method, which introduces sludge from the settling tank into the thickening tank and then dehydrates it.

In an embodiment of the present invention, the apparatus further provided with a sludge carrying out means installed on the settling section of the return sludge reaction tank and a sludge return pump installed on the suspended solid separation tank, wherein carrying-out amount of the sludge carrying means and discharge amount of the sludge return pump are controlled by an inverter according to a measured result of the measuring instrument.

In the waste water treatment apparatus of the embodiment, according to a measured result of the measuring instrument of the supernatant measurement tank, both the take-out amount of the sludge carrying out means and the discharge amount of the sludge return pump installed on the SS separation tank are controlled by the inverter. Accordingly, the amount and state of sludge in the return sludge reaction tank of the waste water treatment apparatus can be appropriately controlled.

More specifically, maintaining the amount of sludge in the return sludge reaction tank appropriately by the measuring instrument means that the amount of the sludge is so controlled that it has an appropriate amount to prevent the greater part of sludge in the return sludge reaction tank from flowing into the supernatant measurement tank. Supposing that the sludge of the return sludge reaction tank flows into the supernatant measurement tank, there occurs a problem that owing to the buffering function of the sludge, the system of adding slaked lime is destroyed and as a result, the slaked lime may be added excessively.

Maintaining the state of the return sludge reaction tank appropriately means that unreacted chemicals containing mainly unreacted slaked lime is exhausted by the reaction with fluorine-containing waste water to prevent the unreacted chemicals from moving into the settling section. This means that the unreacted chemicals are all consumed by the fluorine-containing waste water and thus the PH of a supernatant is less than seven.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2A shows a timing chart of the treatment in each tank of the first embodiment in the case where the fluorine concentration of the fluorine-containing waste water is normal;

FIG. 2B shows a timing chart of the treatment in each tank of the first embodiment in the case where the fluorine concentration of the fluorine-containing waste water is low;

FIG. 4A shows a timing chart of the treatment in each tank of the second embodiment in the case where the fluorine concentration of the fluorine-containing waste water is normal;

FIG. 4B shows a timing chart of the treatment in each tank of the second embodiment in the case where the fluorine concentration of the fluorine-containing waste water is low;

FIG. 5 is a block diagram showing a third embodiment of the waste water treatment apparatus of the present invention;

FIG. 6 is a block diagram showing a fourth embodiment of the waste water treatment apparatus of the present invention;

FIG. 7 is a block diagram showing a fifth embodiment of the waste water treatment apparatus of the present invention;

FIG. 8 is a block diagram showing a sixth embodiment of the waste water treatment apparatus of the present invention;

FIG. 9 is a block diagram showing a seventh embodiment of the waste water treatment apparatus of the present invention;

FIG. 10A shows a timing chart of the treatment in each tank of the seventh embodiment in the case where the fluorine concentration of the fluorine-containing waste water is normal;

FIG. 10B shows a timing chart of the treatment in each tank of the seventh embodiment in the case where the fluorine concentration of the fluorine-containing waste water is low;

FIG. 11 is a block diagram showing an eighth embodiment of the waste water treatment apparatus of the present invention;

FIG. 12A shows a timing chart of the treatment in each tank of the eighth embodiment in the case where the fluorine concentration of the fluorine-containing waste water is normal;

FIG. 12B shows a timing chart of the treatment in each tank of the eighth embodiment in the case where the fluorine concentration of the fluorine-containing waste water is low;

DETAILED DESCRIPTION OF THE PREFERRED EMBODIMENTS

The embodiments of the present invention will be described below with reference to the accompanying drawings.

(First Embodiment)

Figure 1:
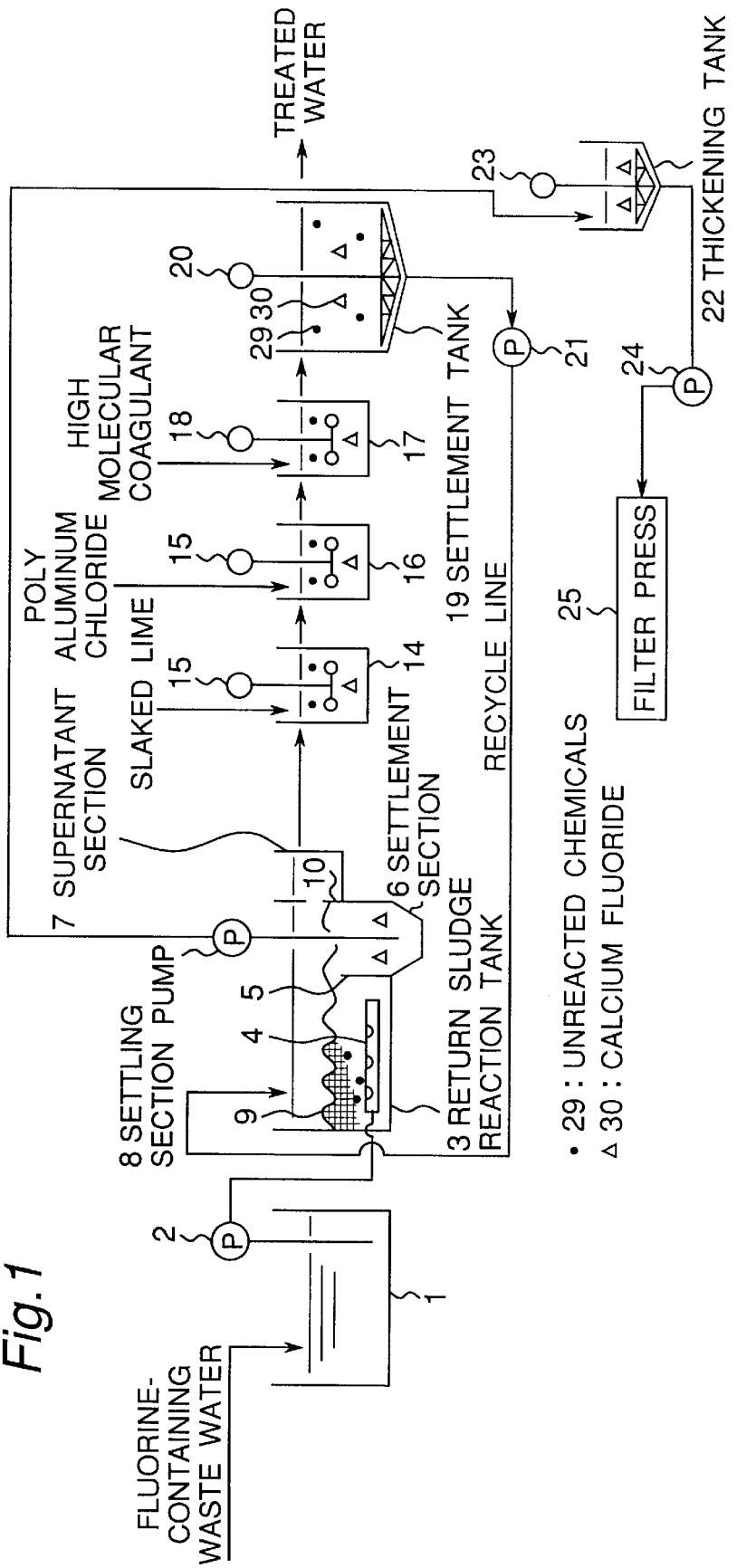
FIG. 1 is a block diagram showing a first embodiment of the waste water treatment apparatus of the present invention.

FIG. 1 shows a first embodiment of the waste water treatment apparatus of the present invention. In the first embodiment of the waste water treatment apparatus, fluorine-containing waste water is treated sequentially by a return sludge reaction tank 3 having a settling section 6 in its rear portion, a slaked lime reaction tank 14, a poly aluminum chloride coagulating tank 16, a high molecular coagulating tank 17, and a settling tank 19. In the first embodiment, sludge not containing unreacted chemicals 29 generated in the settling section 6 of the return sludge reaction tank 3 is introduced into a thickening tank 22 and dehydrated by a filter press 25.

The fluorine-containing waste water is introduced into a raw water tank (first tank) 1. A raw water tank pump 2 feeds the fluorine-containing waste water to a lower inflow pipe 4 installed at a lower portion of the return sludge reaction tank 3 and discharges the waste water upward in the return sludge reaction tank 3 (second tank). A large amount of alkaline sludge having PH 8.0–8.5 is sent in advance from the settling tank 19 (seventh tank) 19 to the return sludge reaction tank 3 to form an anaerobic sludge zone 9. Because the return sludge reaction tank 3 does not have a stirring means such as a stirrer and an aerating means such as an air diffusing pipe, the anaerobic sludge zone 9 settles stably in the lower portion of the return sludge reaction tank 3.

The sludge containing the unreacted chemicals 29 in the anaerobic sludge zone 9 first reacts with the acidic fluorine-containing waste water, and then moves into the settling section 6 through an upper portion of a separating wall 5.

The introduced amount of the fluorine-containing waste water into the return sludge reaction tank 3 and the returned amount of the sludge from the settling tank 19 to the return sludge reaction tank 3 are adjusted to prevent the sludge in the settling section 6 from containing the unreacted chemicals 29. In order to let the sludge not contain the unreacted chemicals 29, the introduced amount of the fluorine-containing waste water and the returned amount of the sludge from the settling tank 19 must be adjusted such that the sludge to be transferred to the thickening tank 22 becomes neutral or weak acidic, i.e., the sludge PH becomes less than 7.

By this adjustment, the sludge in the settling section 6 consists only of the calcium fluoride 30 and this calcium fluoride is transferred to the thickening tank (eighth tank) 22 by the pump 8 of the settling section 6.

After fluorine is primarily treated in the anaerobic sludge zone 9 of the return sludge reaction tank 3, the waste water passes over a separating wall 10 and flows into a supernatant section 7. The separating wall 10 is designed to prevent the sludge consisting of the heavy calcium fluoride 30 from flowing into the supernatant section 7.

The sludge returned from the settling tank 19 to the return sludge reaction tank 3 is a weak alkali having a PH range 8.0–8.5. The weak alkali sludge having the PH range 8.0–8.5 contains unreacted slaked lime, unreacted poly aluminum chloride, and unreacted high-molecular coagulant. The acidic fluorine-containing waste water having PH 2–3 is neutralized gradually by alkaline components while the fluorine-containing waste water is dissolving components such as calcium of weak alkaline sludge in the anaerobic sludge zone 9.

It is possible to obtain treated water of weak acidic or neutral, namely, having a PH range less than 7 and more than 5 by setting the retention time of the fluorine-containing waste water in the return sludge reaction tank 3 to more than two hours, except in the settling section 6 and the supernatant section 7. The fluorine-containing waste water having the PH range less than 7 and more than 5 flows into the slaked lime reaction tank (fourth tank) 14 from the supernatant section 7. A quick stirrer 15 is installed in the slaked lime reaction tank 14 to stir residual fluorine in the waste water which has not reacted in the return sludge reaction tank 3 together with newly added slaked lime. Thereby, the fluorine is caused to react with the slaked lime for a secondary treatment. That is, the fluorine in the waste water is primarily treated in the return sludge reaction tank 3 and secondarily in the slaked lime reaction tank 14.

The fluorine in the waste water having remained in the slaked lime reaction tank 14 forms fine calcium fluoride in consequence of the addition of the slaked lime and the stirring of the quick stirrer 15. Then, the waste water is introduced into the poly aluminum chloride coagulating tank (fifth tank) 16 in which poly aluminum chloride serving as an inorganic coagulant is added to the waste water to form large flocs. The floc-containing waste water is introduced into the high molecular coagulating tank (sixth tank) 17 in which a slow stirrer 18 is installed. Owing to the addition of the high-molecular coagulant, the large floc becomes a more stable and settleable larger floc. The more stable and settleable larger floc flows into the settling tank 19 having a scraper 20 and settles in a lower portion of the settling tank 19. The supernatant in the settling tank 19 becomes treated water.

Because the slaked lime has been added to the waste water in the slaked lime reaction tank 14, the floc, namely, the sludge which has settled in the settling tank 19 contains unreacted slaked lime. Because the poly aluminum chloride is excessively added to the waste water in the poly aluminum chloride coagulating tank 16, the sludge also contains unreacted poly aluminum chloride. Further, because the high-molecular coagulant is excessively added to the waste water in the high molecular coagulating tank 17, the sludge also contains unreacted high-molecular coagulant.

All the sludge that has settled in the settling tank 19 is returned to the upper portion of the return sludge reaction tank 3 by the sludge return pump 21, and therefore all the unreacted chemicals 29 are recycled. The sludge in the anaerobic sludge zone 9 moves to the settling section 6 and is transferred to the thickening tank 22 by the pump 8 to be thickened (condensed) there. Then, the sludge is transferred to the filter press 25 by a filter press pump 24 to be dehydrated.

FIG. 2A shows a timing chart of the treatment in each tank in the case where the fluorine concentration of the fluorine-containing waste water is normal. FIG. 2B shows a timing chart of the treatment in each tank in the case where the fluorine concentration of the fluorine-containing waste water is low.

In the first embodiment, all the sludge in the settling tank 19 is introduced into the return sludge reaction tank 3. Therefore, unlike the conventional waste water treatment apparatus, the unreacted chemical-containing sludge discharged from the settling tank is not introduced into the thickening tank 22 succeeding to the settling tank 19.

In the waste water treatment apparatus, the sludge which has settled in the settling tank 19 is treated by introducing (returning) it into "the return sludge reaction tank 3 having the settling section 6 in its rear portion". Therefore, the unreacted chemicals contained in the sludge that has settled in the settling tank 19 can be utilized in the return sludge reaction tank 3. That is, the unreacted chemicals are not discharged as sludge. Accordingly, as compared with the conventional treatment method of extracting the sludge from the settling tank 19, it is possible to reduce the amount of generated sludge remarkably and consequently, reduce the sludge disposal fee, the use amount of the slaked lime, and the running cost such as the maintenance cost of the dehydrator.

Further, in the waste water treatment apparatus, it is possible to take out a necessary amount of the reacted sludge from the return sludge reaction tank 3 as necessary, because the sludge carrying out pump 8 is installed in the settling section 6 of the return sludge reaction tank 3. Accordingly, an excess amount of sludge is not stored in the waste water treatment apparatus. Thus, the system of the waste water treatment apparatus can operate stably.

Furthermore, the return sludge reaction tank 3 has the settling section 6 and the supernatant section 7. Thus, in the waste water treatment apparatus of the first embodiment, the reaction precipitate can be moved to the settling section 6 and the supernatant can be moved to the supernatant section 7 to accomplish the separation of the liquid and the solid after the reaction of the waste water in the return sludge reaction tank 3. That is, the separation of the liquid and the solid can be achieved not by preparing a particular separate settling tank but by using a part of the return sludge reaction tank 3. Thus, the initial cost can be reduced.

Because the waste water treatment apparatus of the first embodiment has the pump as the sludge-carrying out means, the waste water treatment apparatus can be constructed easily and at low cost.

In the waste water treatment apparatus of the first embodiment, the fluorine-containing waste water is treated by being sequentially introduced into many tanks, namely, "the return sludge reaction tank 3 having the settling section 6 in its rear portion", the slaked lime reaction tank 14, the poly aluminum chloride coagulating tank 16, the high molecular coagulating tank 17, and the settling tank 19. Therefore, the fluorine-containing waste water can be treated securely. In particular, the fluorine-containing waste water is treated by returning it into the return sludge reaction tank 3 that is not installed on the conventional waste water treatment apparatus. That is, the unreacted chemicals contained in the returned sludge are recycled. Thus, it is possible to reduce the running cost.

In the waste water treatment apparatus of the first embodiment, only the sludge generated in the return sludge reaction tank 3 is introduced into the thickening tank 22 and dehydrated in the succeeding concentration tank 22. Therefore, the sludge does not contain unreacted slaked lime, but consists of the sludge of calcium fluoride that is a reaction product. Accordingly, the waste water treatment apparatus has an effect of generating a smaller amount of the sludge than that of the sludge, discharged directly from the settling tank 19. Further, the unreacted chemicals such as the unreacted slaked lime can be recycled. Thus, the waste water treatment apparatus has the effect of effectively utilizing resources.

(Second Embodiment)

Figure 3:
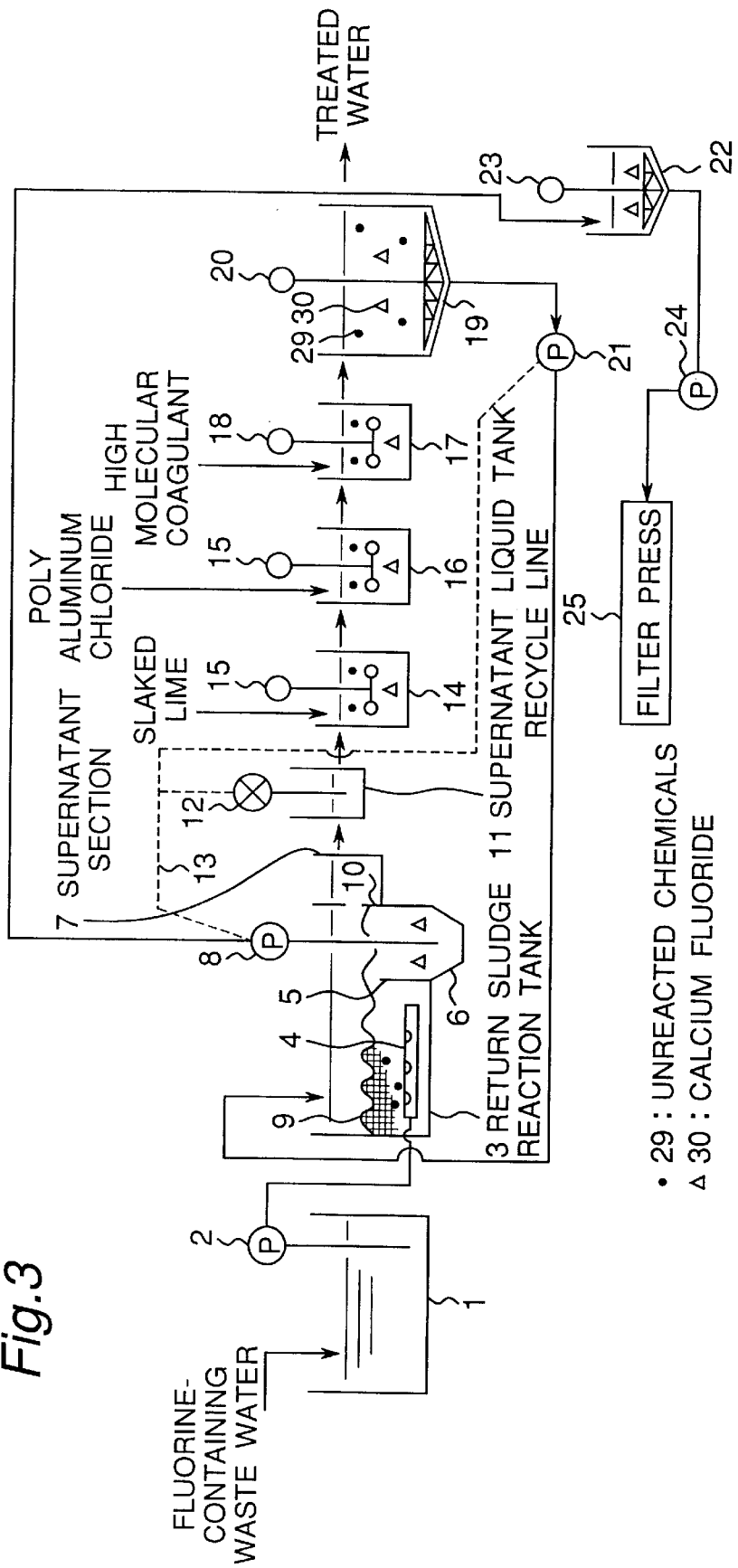
FIG. 3 is a block diagram showing a second embodiment of the waste water treatment apparatus of the present invention.

FIG. 3 shows a second embodiment of the waste water treatment apparatus of the present invention. The second embodiment is different from the first embodiment in that the second embodiment has a supernatant measuring tank 11. Therefore, the same constituents as those of the first embodiment are denoted by the same reference numerals and are not described herein.

In the second embodiment, the supernatant measuring tank (third tank) 11 is installed between the return sludge reaction tank (second tank) 3 and the slaked lime reaction tank (fourth tank) 14. A measuring instrument 12 is installed on the supernatant measuring tank 11 to measure the quality of supernatant which has flowed into the supernatant measuring tank 11 from the return sludge reaction tank 3. A signal line 13 extending from the measuring instrument 12 is connected to the pumps 8 and 21. More specifically, as the measuring instrument 12, an SS (suspended solid) densitometer and/or a PH meter are selected, depending on treatment conditions of the waste water. As the SS densitometer, SSD type of Denki Kagaku Keiki Co., Ltd. is adopted. As the PH meter, MAC type of Denki Kagaku Keiki Co., Ltd. is adopted. Because these measuring instruments are used in an ordinary waste water treatment apparatus and not a particular one, they can be obtained easily. The capacity of the supernatant liquid measuring tank 11 is so set that the retention time of the waste water therein is about 20 minutes.

Let it be supposed that the measuring instrument 12 installed on the supernatant measuring tank 11 is the SS densitometer. If an SS concentration in the supernatant measuring tank 11 is more than 1000 ppm, according to a signal of the SS densitometer, the amount of the sludge in the anaerobic sludge zone 9 of the return sludge reaction tank 3 is kept at an appropriate amount by decreasing the amount of the sludge therein. For this purpose, the discharge amount of the pump 8 of the settling section 6 is increased and the discharge amount of the sludge return pumps 21 is decreased by the inverter control based on the signal. A proper amount of the sludge in the anaerobic sludge zone 9 is about 50% of the entire capacity of the anaerobic sludge zone 9.

Let it be supposed that the measuring instrument 12 installed on the supernatant measuring tank 11 is the PH meter. If the value of the PH meter in the supernatant liquid measuring tank 11 is more than seven, according to a signal of the PH meter, the amount of the sludge in the anaerobic sludge zone 9 of the return sludge reaction tank 3 is kept at an appropriate amount by an automatic control so that the value of the PH meter becomes less than PH 7. For this purpose, the discharge amount of the pump 8 of the settling section 6 is increased and the discharge amount of the sludge return pump 21 is decreased by the inverter control based on the signal.

The PH range of the returned sludge through the sludge return pump 21 is here 8.0–8.5. This is because the returned sludge contains the alkaline unreacted slaked lime. Depending on a case, the returned sludge sometimes contains much unreacted slaked lime and exibits a PH value higher than 8.5.

Let it be supposed that the SS densitometer and the PH meter are installed on the supernatant measuring tank 11 as the measuring instrument 12. If the SS concentration in the supernatant measuring tank 11 is more than 1000 ppm or the value of the PH meter is more than PH 7, according to a signal of the SS densitometer or the PH meter, the discharge amount of the pump 8 of the settling section 6 is increased, and the discharge amount of the sludge return pump 21 is decreased by the inverter control based on the signal. In this manner, the amount of the sludge in the anaerobic sludge zone 9 of the return sludge reaction tank 3 is kept at an appropriate amount to maintain the SS concentration less than 1000 ppm and maintain the PH less than 7 in the supernatant measurement tank 11.

FIG. 4A shows a timing chart of the treatment in each tank in the case where the fluorine concentration of the fluorine-containing waste water is normal. FIG. 4B shows a timing chart of the treatment in each tank in the case where the fluorine concentration of the fluorine-containing waste water is low.

In the waste water treatment apparatus of the second embodiment, based on a measured result of the measuring instrument 12 of the supernatant measurement tank 11, the carrying out amount of the sludge pump 8 and the discharge amount of the sludge return pump 21 are controlled by the inverter. Thus, the amount of the sludge in the waste water treatment apparatus can be properly maintained. That is, whether or not the amount of the sludge in the waste water treatment apparatus is proper is determined by the water quality in the supernatant measurement tank 11: If the amount of the sludge in the waste water treatment apparatus increases, the water quality in the supernatant measurement tank 11 changes.

In the waste water treatment apparatus of the second embodiment, when the SS densitometer is installed on the supernatant measurement tank 11 as the measuring instrument 12, the sludge concentration (SS concentration) of the supernatant section 7 located at the outlet of the return sludge reaction tank 3 can be maintained properly. That is, by properly controlling the sludge concentration of the supernatant section 7 located at the outlet of the return sludge reaction tank 3, the entire sludge amount of the return sludge reaction tank 3 can be controlled.

In the waste water treatment apparatus of the second embodiment, when the PH meter is installed on the supernatant liquid measurement tank 11 as the measuring instrument 12, the PH in the supernatant section 7 located at the outlet of the return sludge reaction tank 3 can be maintained at a proper value. That is, by properly controlling the sludge concentration of the supernatant section 7 located at the outlet of the return sludge reaction tank 3, the PH of the entire return sludge reaction tank 3 can be controlled.

In the waste water treatment apparatus of the second embodiment, in the case where both the SS densitometer and the PH meter are installed on the supernatant measuring tank 11 as the measuring instrument 12, the SS concentration and the PH in the supernatant section 7 located at the outlet of the return sludge reaction tank 3 can be maintained properly. That is, by properly controlling the SS concentration and the PH in the supernatant section 7 located at the outlet of the return sludge reaction tank 3, the SS concentration and the PH in the entire return sludge reaction tank 3 can be controlled.

(Third Embodiment)

FIG. 5 shows a third embodiment of the waste water treatment apparatus of the present invention. The third embodiment is different from the second embodiment in that the supernatant measuring tank 11 is not provided, that hydrogen peroxide-containing waste water is introduced into the raw water tank 1, and that organism treatment water is introduced into the return sludge reaction tank 3. Therefore, the same constituents as those of the second embodiment are denoted by the same reference numerals and are not described herein.

The third embodiment is different from the second embodiment in the kind of waste water that flows into the raw water tank 1. That is, in the second embodiment, the waste water flowing into the raw water tank 1 is only the fluorine-containing waste water, whereas in the third embodiment, organic matter- and fluorine-containing waste water and the hydrogen peroxide-containing waste water flow into the raw water tank 1. The third embodiment is also different from the second embodiment in that not only the returned sludge but also the organism treatment water is introduced into the return sludge reaction tank 3.

The organism treatment water contains microorganism 31. When the organism treatment water flows into the upper portion of the return sludge reaction tank 3, the waste water has already passed through the anaerobic sludge zone 9. Thus, in the upper portion of the return sludge reaction tank 3, the waste water is neutralized and the microorganism 31 propagates with organic matters in the organic matter- and fluorine-containing waste water as a nutrient. While the acidic organic matter- and fluorine-containing waste water is passing through the anaerobic sludge zone 9, the organic matter- and fluorine-containing waste water is neutralized. That is, the unreacted slaked lime present in the anaerobic sludge zone 9 neutralizes the organic matter- and fluorine-containing waste water.

Because an aeration device is not installed in the return sludge reaction tank 3, the inside of the return sludge reaction tank 3 is in an anaerobic state and thus anaerobic microorganisms propagate therein in particular. Thus, owing to the reducing effect of the anaerobic microorganisms, the hydrogen peroxide contained in the waste water can be treated. The anaerobic microorganisms propagate in the return sludge reaction tank 3, the slaked lime reaction tank 14, the poly aluminum chloride coagulating tank 16, the high molecular coagulating tank 17, and the settling tank 19 with a slight amount of organic matters contained in the waste water as a nutrient and decompose the hydrogen peroxide in the waste water securely. Because the hydrogen peroxide contained in the waste water is treated reliably, the COD (Chemical Oxygen Demand) value in the treated water does not rise owing to the presence of the hydrogen peroxide, and thus the quality of the treated water does not deteriorate.

(Fourth Embodiment)

FIG. 6 shows a fourth embodiment of the waste water treatment apparatus of the present invention. The fourth embodiment is different from the third embodiment in that the supernatant measuring tank 11 is installed between the return sludge reaction tank 3 and the slaked lime reaction tank 14. Therefore, the same constituents as those of the third embodiment are denoted by the same reference numerals and are not described.

The measuring instrument 12 for measuring the quality of the supernatant is installed on the supernatant measuring tank 11. A signal line 13 extending from the measuring instrument 12 is connected to the pumps 8 and 21. As the measuring instrument 12, the SS densitometer and/or the PH meter are selected, depending on treatment conditions of waste water. As the SS densitometer, SSD type of Denki Kagaku Keiki Co., Ltd. is adopted. As the PH meter, MAC type of Denki Kagaku Keiki Co., Ltd. is adopted. Because these measuring instruments are used in an ordinary waste water treatment apparatus and not a particular one, they can be obtained easily.

The capacity of the supernatant measuring tank 11 is so set that the retention time of the waste water therein is about 10 minutes. Let it be supposed that the measuring instrument 12 installed on the supernatant measuring tank 11 is the SS densitometer. If an SS concentration in the supernatant measuring tank 11 is more than 1000 ppm, according to a signal of the SS densitometer, the amount of the sludge in the anaerobic sludge zone 9 of the return sludge reaction tank 3 is kept at an appropriate amount by decreasing the amount of the sludge therein. For this purpose, the discharge amount of the pump 8 of the settling section 6 is increased by an inverter control, and the discharge amount of the sludge return pipe 21 is decreased by the inverter control. A proper amount of the sludge in the anaerobic sludge zone 9 is less than 50% of the entire capacity of the anaerobic sludge zone 9.

Let it be supposed that the measuring instrument 12 installed on the supernatant measuring tank 11 is the PH meter. If the value of the PH meter in the supernatant liquid measuring tank 11 is more than PH7, according to a signal of the PH meter, the amount of the sludge in the anaerobic sludge zone 9 of the return sludge reaction tank 3 is kept at an appropriate amount by an automatic control so that the value of the PH meter becomes less than PH 7. For this purpose, the discharge amount of the pump 8 of the settling section 6 is increased and the discharge amount of the sludge return pump 21 is decreased by the inverter control based on the signal. The PH range of the returned sludge through the sludge return pump 21 is 8.0–8.5. This is because the returned sludge contains the unreacted slaked lime.

Let it be supposed that the SS densitometer and the PH meter are installed on the supernatant measuring tank 11 as the measuring instrument 12. If the SS concentration in the supernatant measuring tank 11 is more than 1000 ppm or the value of the PH meter is more than PH 7, according to the signal of the SS densitometer or the PH meter, the discharge amount of the pump 8 of the settling section 6 is increased, and the discharge amount of the sludge return pump 21 is decreased by the inverter control based on the signal. In this manner, the amount of the sludge in the anaerobic sludge zone 9 of the return sludge reaction tank 3 is kept at an appropriate amount to maintain the SS concentration less than 1000 ppm and maintain the PH at less than 7 in the supernatant liquid measurement tank 11.

(Fifth Embodiment)

FIG. 7 shows a fifth embodiment of the waste water treatment apparatus of the present invention. The fifth embodiment is different from the first embodiment in that silicon-containing waste water is introduced into the raw water tank 1 in addition to the fluorine-containing waste water. Therefore, the same constituents as those of the first embodiment are denoted by the same reference numerals and are not described.

In the fifth embodiment, the silicon-containing waste water is introduced into the raw water tank 1 in addition to the fluorine-containing waste water. The pump 2 of the raw water tank 1 feeds mixture waste water of the fluorine-containing waste water and the silicon-containing waste water to a lower inflow pipe 4 installed at a lower portion of the return sludge reaction tank 3 and discharge it in the anaerobic sludge zone 9. Because the sludge in the anaerobic sludge zone 9 contains silicon, the sludge is heavier than sludge not containing the silicon. Therefore, it is possible to make the anaerobic sludge zone 9 strong and firm.

Although the silicon is fine, it has a specific gravity larger than 1. Thus, mixing with the returned sludge, the silicon makes the sludge heavier to prevent the anaerobic sludge zone 9 from being destroyed by a rapid water flow discharged from the lower inflow pipe 4. Accordingly, the mixture waste water does not pass through a short cut hole which might be formed through the anaerobic sludge zone 9 by raising-away of sludge but is always treated with the unreacted chemicals contained in the anaerobic sludge zone 9. Therefore, the waste water treatment apparatus can operate stably.

The sludge containing the silicon in the anaerobic sludge zone 9 of the return sludge reaction tank 3 moves toward the settling section 6 in the lower portion of the return sludge reaction tank 3 and passes over a separating wall 5, and moves into the settling section 6. Then, the sludge is transferred to the thickening tank 22 by the pump 8 installed on the upper portion of the settling section 6 to be condensed in the thickening tank 22. Then, the sludge is transferred to the filter press 25 by a filter press pump 24 to be dehydrated.

(Sixth Embodiment)

FIG. 8 shows a sixth embodiment of the waste water treatment apparatus of the present invention. The sixth embodiment is different from the fifth embodiment in that the supernatant measuring tank 11 is installed between the return sludge reaction tank 3 and the slaked lime reaction tank 14. Further, the sixth embodiment is different from the second embodiment in that silicon-containing waste water flows into the raw water tank 1 in addition to the fluorine-containing waste water. Thus, the different points from the second embodiment is mainly described below.

In the sixth embodiment, the silicon-containing waste water is introduced into the raw water tank 1 in addition to the fluorine-containing waste water. The pump 2 of the raw water tank 1 feeds mixture waste water of the fluorine-containing waste water and the silicon-containing waste water to a lower inflow pipe 4 installed at a lower portion of the return sludge reaction tank 3 and discharge it in the anaerobic sludge zone 9.

Because the sludge in the anaerobic sludge zone 9 contains silicon, the sludge is heavier than sludge not containing the silicon. Therefore, it is possible to make the anaerobic sludge zone 9 strong and firm. Although the silicon is fine, it has a specific gravity larger than 1. Thus, mixing with the returned sludge, the silicon makes the sludge heavier to prevent the anaerobic sludge zone 9 from being destroyed by a rapid water flow discharged from the lower inflow pipe 4. Accordingly, the mixture waste water does not pass through a short cut hole which might be formed through the anaerobic sludge zone 9 by raising-away of sludge but is always treated with the unreacted chemicals contained in the anaerobic sludge zone 9. Therefore, the waste water treatment apparatus can operate stably.

The sludge containing the silicon in the anaerobic sludge zone 9 of the return sludge reaction tank 3 moves toward the settling section 6 in the lower portion of the return sludge reaction tank 3 and passes over a separating wall 5, and moves into the settling section 6. Then, the sludge is transferred to the eighth tank as a thickening tank by the pump 8 installed on the upper portion of the settling section 6 to be condensed in the thickening tank 22. Then, the sludge is transferred to the filter press 25 by a filter press pump 24 to be dehydrated.

(Seventh Embodiment)

FIG. 9 shows a seventh embodiment of the waste water treatment apparatus of the present invention. The seventh embodiment is different from the first embodiment in the following point. Therefore, the same constituents as those of the first embodiment are denoted by the same reference numerals and are not described. That is, the seventh embodiment is different from the first embodiment in that in the seventh embodiment, an SS separation tank 37 is installed instead of the settling tank 19 of the first embodiment.

In the seventh embodiment, a submerged film 33 is installed in the SS separation tank (seventh tank) 37 in place of the settling tank 19 of the first embodiment. The submerged film 33 is connected to a submerged film pump 34 and a pipe. Further, an air diffuser 35 for air cleaning is provided below the submerged film 33. The air diffuser 35 is connected to a blower 36 through pneumatic piping. As the blower 36, an ordinary root-type blower (manufactured by Anlet Ltd.) is selected.

The capacity of the SS separation tank 37 is so set that the retention time of the waste water therein is about three hours or less, similarly to the settling tank 19 of the first embodiment.

The method of treating the waste water in the settling tank is conventionally physical settling method, whereas the waste water treatment method by the submerged film 33 and the pump 34 is forced physical settling method. Thus, even though the SS separation tank 37 has a small capacity, its waste water-treating performance is preferable. That is, it is possible to use the SS separation tank 37 having a smaller capacity than the settling tank. More specifically, there is no problem even though the SS separation tank 37 is so constructed that it has a capacity about half of that of the settling tank, depending on the design of the submerged film 33. As the submerged film 33, an ultra filter film (manufactured by Kabushikikaisha Kubota) or a micro filter film (manufactured by Mitsubishi Rayon Ltd.) can be selected. The material of the SS separation tank 37 is not limited to a specific one but concrete or iron is used.

The floc sludge- and unreacted chemical-containing waste water discharged from the high molecular coagulating tank (sixth tank) 17 flows into the SS separation tank 37 and is minutely filtered with the submerged film 33. The submerged film pump 34 discharges the treated water minutely filtered to the outside of the waste water treatment system.

The sludge return pump 21 returns waste water containing the unreacted chemicals and stored in the lower portion or the entire portion of the SS separation tank 37 to the return sludge reaction tank 3 in which the unreacted chemicals are treated with the fluorine-containing waste water.

FIG. 10A shows a timing chart of the treatment in each tank in the case where the fluorine concentration of the fluorine-containing waste water is normal. FIG. 10B shows a timing chart of the treatment in each tank in the case where the fluorine concentration of the fluorine-containing waste water is low.

The waste water treatment apparatus of the seventh embodiment has the SS separation tank 37 in place of the settling tank. Therefore, unlike the conventional settling tank in which the flow-out of SS (suspended solid) often occurs, the waste water treatment apparatus of the seventh embodiment will not cause SS flow out and can maintain the SS concentration of the treated water reliably.

(Eighth Embodiment)

FIG. 11 shows an eighth embodiment of the waste water treatment apparatus of the present invention. The eighth embodiment is different from the second embodiment (FIG. 3) in only the following point i). Therefore, the same constituents as those of the second embodiment are denoted by the same reference numerals and is not described in detail.

i) The eighth embodiment is different from the second embodiment in that in the eighth embodiment, the SS separation tank 37 is installed instead of the settling tank 19 of the second embodiment.

In the eighth embodiment, the submergence film 33 is installed inside the SS separation tank (seventh tank) 37 in place of the settling tank 19 of the second embodiment. The submerged film 33 is connected to the submerged film pump 34 and the pipe.

The air diffuser 35 is provided below the submerged film 33 for air cleaning. The air diffuser 35 is connected to the blower 36 through pneumatic piping. As the blower 36, the ordinary root-type blower (manufactured by Anlet Ltd.) is selected.

The capacity of the SS separation tank 37 is so set that the retention time of the waste water therein is about three hours or less, similarly to the settling tank 19 of the first embodiment. The reason the SS separation tank 37 is allowed to have a smaller capacity than the settling tank is because the method of treating the waste water in the settling tank is conventionally physical settling method, whereas the waste water treatment method by the submerged film 33 and the pump 34 is forced physical settling method. Thus, even though the SS separation tank 37 has a small capacity, its waste water-treating performance is preferable. That is, it is possible to use the SS separation tank 37 having a smaller capacity than the settling tank. More specifically, there is no problem even though the SS separation tank 37 is so constructed that it has a capacity about half of that of the settling tank, depending on the design of the submerged film 33.

As the submerged film 33, the ultra filter film (manufactured by Kabushikikaisha Kubota) or the micro filter film (manufactured by Mitsubishi Rayon Ltd.) can be selected.

The material of the SS separation tank 37 is not limited to a specific one but concrete or iron is used.

The floc sludge- and unreacted chemical-containing waste water discharged from the high molecular coagulating tank (sixth tank) 17 flows into the SS separation tank 37 and is minutely filtered with the submerged film 33. The submerged film pump 34 discharges the treated water minutely filtered to the outside of the waste water treatment system.

The sludge return pump 21 returns waste water containing the unreacted chemicals and stored in the lower portion or the entire portion of the SS separation tank 37 to the return sludge reaction tank 3 in which the unreacted chemicals are treated with the fluorine-containing waste water.

FIG. 12A shows a timing chart of the treatment in each tank in the case where the fluorine concentration of the fluorine-containing waste water is normal. FIG. 12B shows a timing chart of the treatment in each tank in the case where the fluorine concentration of the fluorine-containing waste water is low.

The waste water treatment apparatus of the seventh embodiment has the SS separation tank 37 in place of the settling tank. Therefore, unlike the conventional settling tank in which the flow-out of SS (suspended solid) often occurs, the waste water treatment apparatus of the seventh embodiment will not cause SS flow out and can maintain the SS concentration of the treated water reliably.

(Ninth Embodiment)

Figure 13:
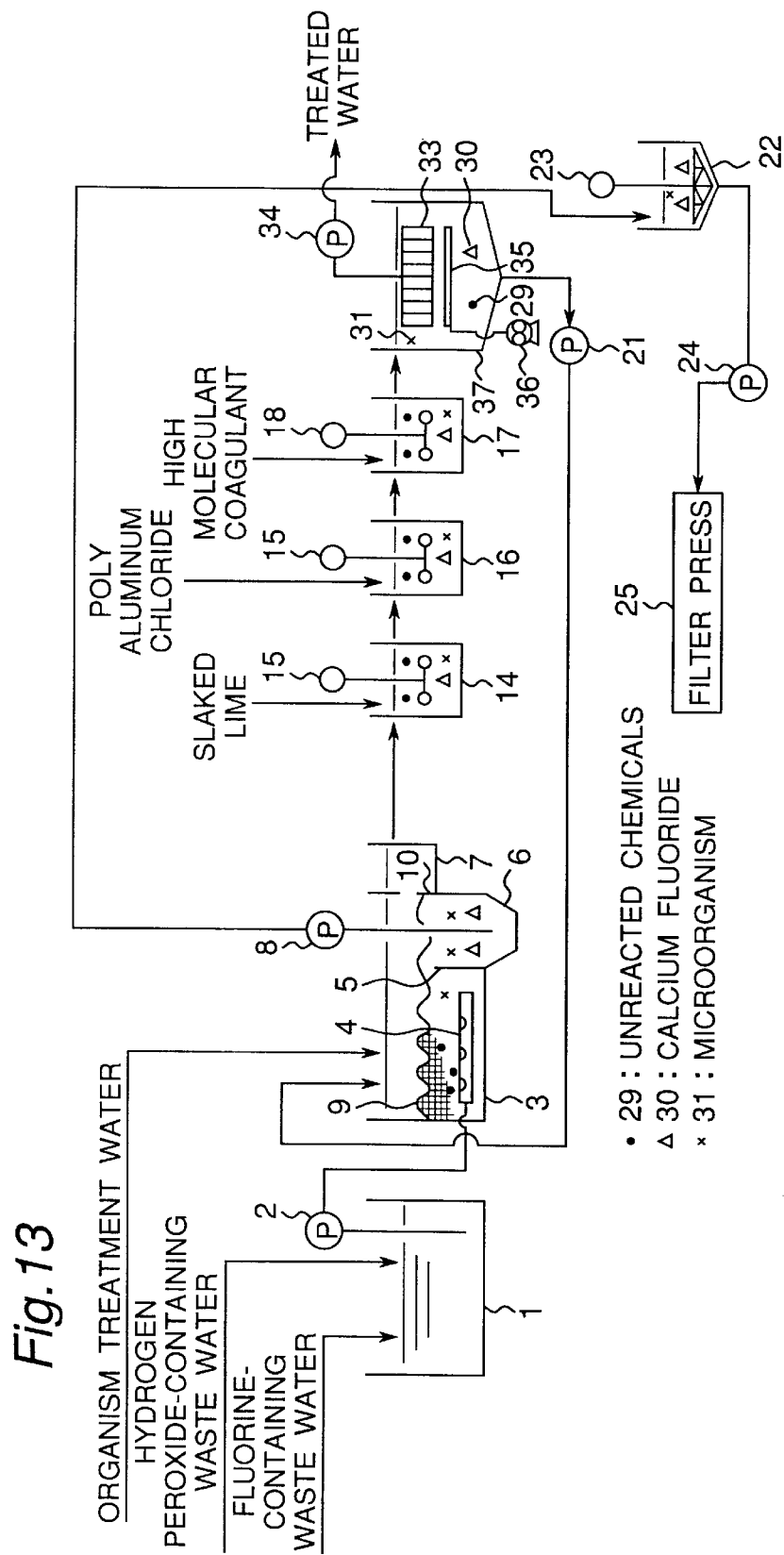
FIG. 13 is a block diagram showing a ninth embodiment of the waste water treatment apparatus of the present invention.

FIG. 13 shows a ninth embodiment of the waste water treatment apparatus of the present invention. The ninth embodiment is different from the third embodiment (FIG. 5) in only the following point. Therefore, the same constituents as those of the third embodiment are denoted by the same reference numerals and are not described in detail. The ninth embodiment is different from the third embodiment in that in the ninth embodiment, the SS separation tank 37 is installed instead of the settling tank 19 of the third embodiment.

In the ninth embodiment, the submerged film 33 is installed in the SS separation tank 37 in place of the settling tank 19 of the third embodiment. The submerged film 33 is connected to the submerged film pump 34 and the pipe.

The air diffuser 35 is provided below the submerged film 33 for air cleaning. The air diffuser 35 is connected to the blower 36 through pneumatic piping. As the blower 36, the ordinary root-type blower (manufactured by Anlet Ltd.) is selected.

Because in the waste water treatment apparatus of the ninth embodiment, the air diffuser 35 is provided below the submerged film 33, when the surface of the submerged film 33 is choked with the SS (suspended solid), the surface can be cleaned by air exhausted from the air diffuser 35. Thus, it is possible to stabilize the function of the waste water treatment apparatus including that of the submerged film 33 for a long time.

The capacity of the SS separation tank 37 is so set that the retention time of the waste water therein is about three hours or less, similarly to the settling tank 19 of the first embodiment. The reason the SS separation tank 37 is allowed to have a smaller capacity than the settling tank is because the method of treating the waste water in the settling tank is conventionally physical settling method, whereas the waste water treatment method by the submerged film 33 and the pump 34 is forced physical settling method. Thus, even though the SS separation tank 37 has a small capacity, its waste water-treating performance is preferable. That is, it is possible to use the SS separation tank 37 having a smaller capacity than the settling tank. More specifically, there is no problem even though the SS separation tank 37 is so constructed that it has a capacity about half of that of the settling tank, depending on the design of the submerged film 33. As the submerged film 33, the ultra filter film (manufactured by Kabushikikaisha Kubota) or the micro filter film (manufactured by Mitsubishi Rayon Ltd.) can be selected. The material of the SS separation tank 37 is not limited to a specific one but concrete or iron is used.

In the ninth embodiment, the floc sludge- and unreacted chemical-containing waste water discharged from the high molecular coagulating tank (sixth tank) 17 flows into the SS separation tank 37 and is minutely filtered with the submerged film 33. The submerged film pump 34 discharges the treated water minutely filtered to the outside of the waste water treatment system. While, the sludge return pump 21 returns waste water containing the unreacted chemicals and stored in the lower portion or the entire portion of the SS separation tank 37 to the return sludge reaction tank 3 in which the unreacted chemicals are treated with the fluorine-containing waste water.

The waste water treatment apparatus of the ninth embodiment has the SS separation tank 37 in place of the settling tank. Therefore, unlike the conventional settling tank in which the flow-out of SS (suspended solid) often occurs, the waste water treatment apparatus of the seventh embodiment will not cause SS flow out and can maintain the SS concentration of the treated water reliably.

Because in the waste water treatment apparatus of the ninth embodiment, the film separation device is constructed of the submergence film 33, the film separation device can be mounted in the tank of the SS separation tank 37, namely, in the water. Thus, the ninth embodiment has the effect of eliminating the increase of the installing area.

(10th Embodiment)

Figure 14:
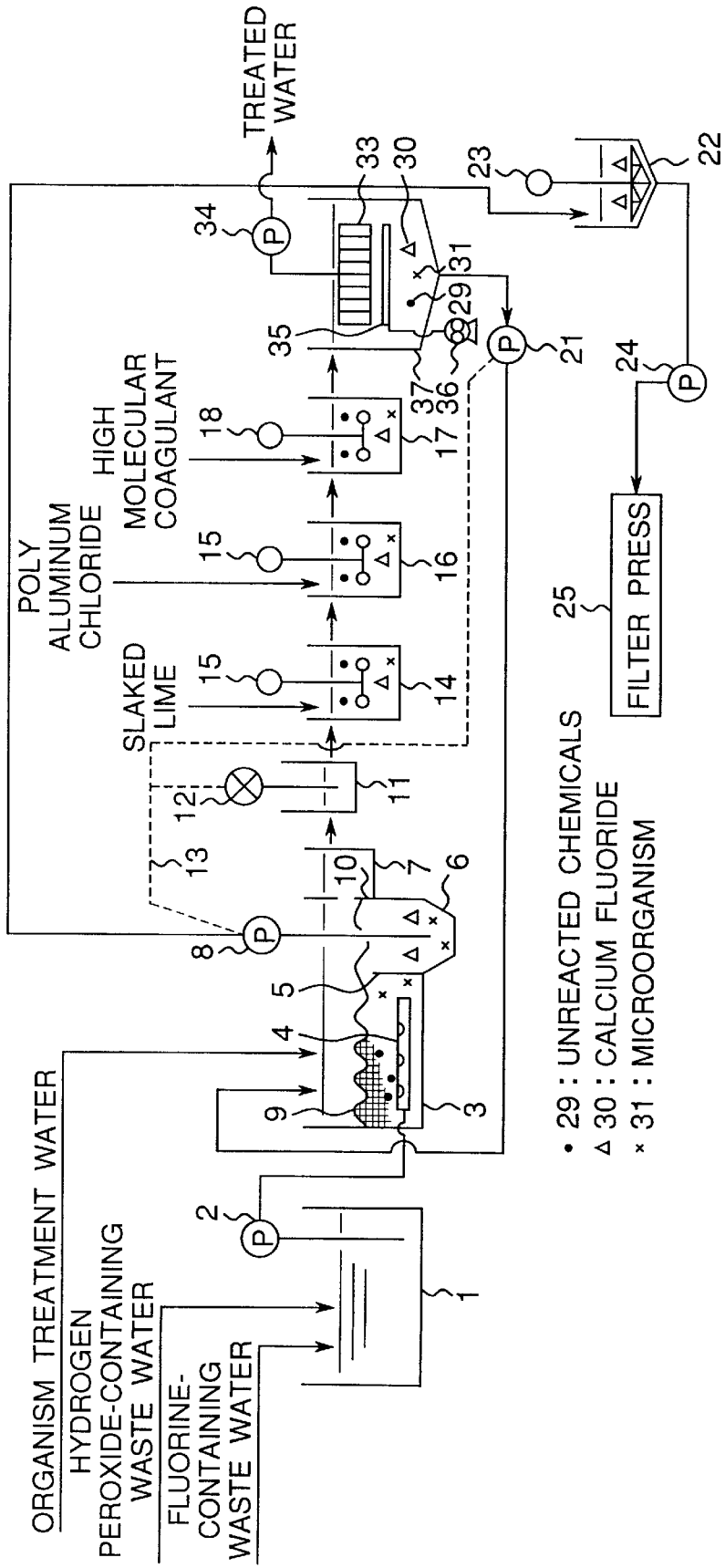
FIG. 14 is a block diagram showing a 10th embodiment of the waste water treatment apparatus of the present invention.

FIG. 14 shows a tenth embodiment of the waste water treatment apparatus of the present invention. The tenth embodiment is different from the fourth embodiment (FIG. 6) in only the following point i). Therefore, the same constituents as those of the fourth embodiment are denoted by the same reference numerals and is not described in detail.

i) The tenth embodiment is different from the fourth embodiment in that in the tenth embodiment, the SS separation tank 37 is installed in place of the settling tank 19 of the fourth embodiment.

In the tenth embodiment, the submerged film 33 is installed in the SS separation tank 37 in place of the settling tank 19 of the fourth embodiment. The submerged film 33 is connected to the submerged film pump 34 and the pipe.

The air diffuser 35 is provided below the submerged film 33 for cleaning air. The air diffuser 35 is connected to the blower 36 through pneumatic piping. As the blower 36, the ordinary root-type blower (manufactured by Anlet Ltd.) is selected.

Because in the waste water treatment apparatus of the ninth embodiment, the air diffuser 35 is provided below the submerged film 33, when the surface of the submerged film 33 is choked with the SS (suspended solid), the surface can be cleaned by air exhausted from the air diffuser 35. Thus, it is possible to stabilize the function of the waste water treatment apparatus including that of the submerged film 33 for a long time.

The capacity of the SS separation tank 37 is so set that the retention time of the waste water therein is about three hours or less, similarly to the settling tank 19 of the first embodiment. The reason the SS separation tank 37 is allowed to have a smaller capacity than the settling tank is because the method of treating the waste water in the settling tank is conventionally physical settling method, whereas the waste water treatment method by the submerged film 33 and the pump 34 is forced physical settling method. Thus, even though the SS separation tank 37 has a small capacity, its waste water-treating performance is preferable. That is, it is possible to use the SS separation tank 37 having a smaller capacity than the settling tank. More specifically, there is no problem even though the SS separation tank 37 is so constructed that it has a capacity about half of that of the settling tank, depending on the design of the submerged film 33.

As the submerged film 33, the ultra filter film (manufactured by Kabushikikaisha Kubota) or the micro filter film (manufactured by Mitsubishi Rayon Ltd.) can be selected. The material of the SS separation tank 37 is not limited to a specific one but concrete or iron is used.

The floc sludge- and unreacted chemical-containing waste water discharged from the high molecular coagulating tank (sixth tank) 17 flows into the SS separation tank 37 and is minutely filtered with the submerged film 33. The submerged film pump 34 discharges the treated water minutely filtered to the outside of the waste water treatment system.

While, the sludge return pump 21 returns waste water containing the unreacted chemicals and stored in the lower portion or the entire portion of the SS separation tank 37 to the return sludge reaction tank 3 in which the unreacted chemicals are treated with the fluorine-containing waste water.

The waste water treatment apparatus of the tenth embodiment has the SS separation tank 37 in place of the settling tank. Therefore, unlike the conventional settling tank in which the flow-out of SS (suspended solid) often occurs, the waste water treatment apparatus of the tenth embodiment will not cause SS flow out and can maintain the SS concentration of the treated water reliably.

Because in the waste water treatment apparatus of the tenth embodiment, the film separation device is constructed of the submergence film 33, the film separation device can be mounted in the tank of the SS separation tank 37, namely, in the water. Thus, the tenth embodiment has the effect of eliminating the increase of the installing area.

(11th Embodiment)

Figure 15:
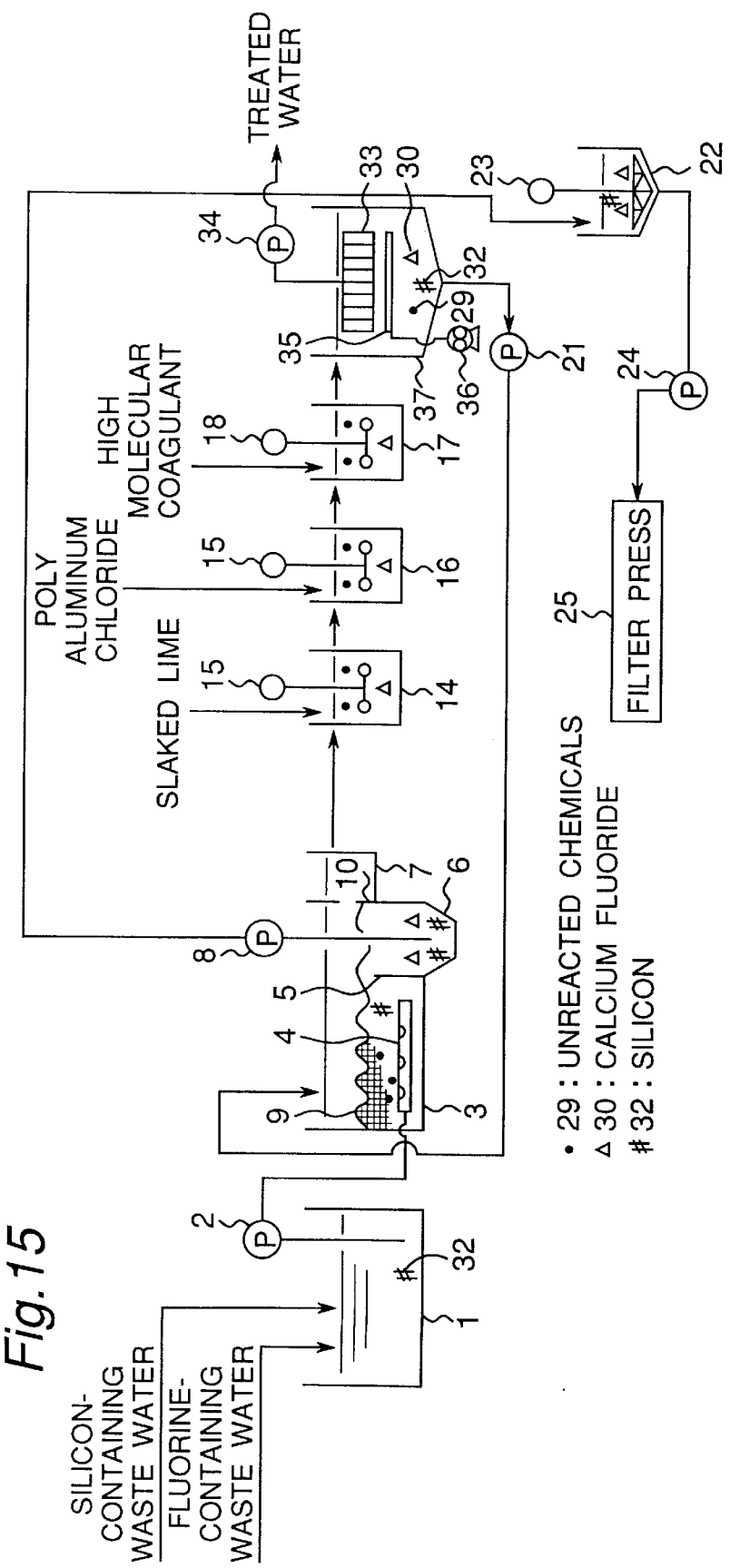
FIG. 15 is a block diagram showing an 11th embodiment of the waste water treatment apparatus of the present invention.

FIG. 15 shows an 11th embodiment of the waste water treatment apparatus according to the present invention. The 11th embodiment is different from the fifth embodiment (FIG. 7) in only the following point i). Therefore, the same constituents as those of the fifth embodiment are denoted by the same reference numerals and are not described in detail.

i) The 11th embodiment is different from the fifth embodiment in that in the 11th embodiment, the SS separation tank 37 is installed instead of the settling tank 19 of the fifth embodiment.

In the eleventh embodiment, the submerged film 33 is installed in the SS separation tank 37 in place of the settling tank 19 of the fifth embodiment. The submerged film 33 is connected to the submerged film pump 34 and the pipe.

The air diffuser 35 is provided below the submerged film 33 for cleaning air. The air diffuser 35 is connected to the blower 36 through pneumatic piping. As the blower 36, the ordinary root-type blower (manufactured by Anlet Ltd.) is selected.

Because in the waste water treatment apparatus of the 11th embodiment, the air diffuser 35 is provided below the submerged film 33, when the surface of the submerged film 33 is choked with the SS (suspended solid), the surface can be cleaned by air exhausted from the air diffuser 35. Thus, it is possible to stabilize the function of the waste water treatment apparatus including that of the submerged film 33 for a long time.

The capacity of the SS separation tank 37 is so set that the retention time of the waste water therein is about three hours or less, similarly to the settling tank 19 of the first embodiment. The reason the SS separation tank 37 is allowed to have a smaller capacity than the settling tank is because the method of treating the waste water in the settling tank is conventionally physical settling method, whereas the waste water treatment method by the submerged film 33 and the pump 34 is forced physical settling method. Thus, even though the SS separation tank 37 has a small capacity, its waste water-treating performance is preferable. That is, it is possible to use the SS separation tank 37 having a smaller capacity than the settling tank. More specifically, there is no problem even though the SS separation tank 37 is so constructed that it has a capacity about half of that of the settling tank, depending on the design of the submerged film 33. As the submerged film 33, the ultra filter film (manufactured by Kabushikikaisha Kubota) or the micro filter film (manufactured by Mitsubishi Rayon Ltd.) can be selected. The material of the SS separation tank 37 is not limited to a specific one but concrete or iron is used.

The floc sludge- and unreacted chemical-containing waste water discharged from the high molecular coagulating tank (sixth tank) 17 flows into the SS separation tank 37 and is minutely filtered with the submerged film 33. The submerged film pump 34 discharges the treated water minutely filtered to the outside of the waste water treatment system.

While, the sludge return pump 21 returns waste water containing the unreacted chemicals and stored in the lower portion or the entire portion of the SS separation tank 37 to the return sludge reaction tank 3 in which the unreacted chemicals are treated with the fluorine-containing waste water.

The waste water treatment apparatus of the 11th embodiment has the SS separation tank 37 in place of the settling tank. Therefore, unlike the conventional settling tank in which the flow-out of SS (suspended solid) often occurs, the waste water treatment apparatus of the seventh embodiment will not cause SS flow out and can maintain the SS concentration of the treated water reliably. Because in the waste water treatment apparatus of the 11th embodiment, the film separation device is constructed of the submergence film 33, the film separation device can be mounted in the tank of the SS separation tank 37, namely, in the water. Thus, the 11th embodiment has the effect of eliminating the increase of the installing area.

(12th Embodiment)

Figure 16:
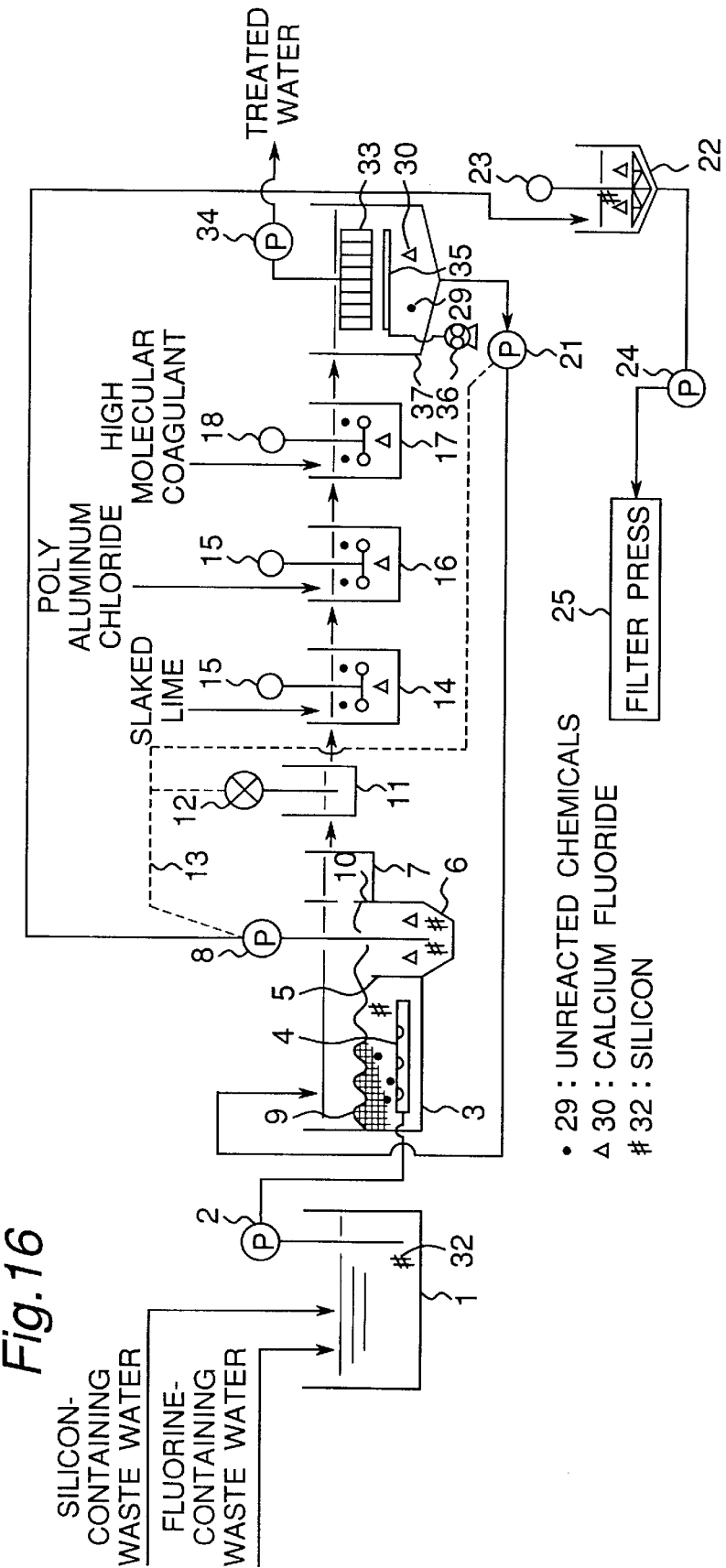
FIG. 16 is a block diagram showing a 12th embodiment of the waste water treatment apparatus of the present invention.

FIG. 16 shows a 12th embodiment of the waste water treatment apparatus of the present invention. The 12th embodiment is different from the sixth embodiment (FIG. 8) in only the following point i). Therefore, the same constituents as those of the sixth embodiment are denoted by the same reference numerals and are not described in detail.

i) The 12th embodiment is different from the sixth embodiment in that in the 12th embodiment, the SS separation tank 37 is installed instead of the settling tank 19 of the sixth embodiment.

In the 12th embodiment, the submerged film 33 is installed in the SS separation tank 37 in place of the settling tank 19 of the sixth embodiment. The submerged film 33 is connected to the submerged film pump 34 and the pipe.

The air diffuser 35 is provided below the submerged film 33 for cleaning air. The air diffuser 35 is connected to the blower 36 through pneumatic piping. As the blower 36, the ordinary root-type blower (manufactured by Anlet Ltd.) is selected. Because in the waste water treatment apparatus of the ninth embodiment, the air diffuser 35 is provided below the submerged film 33, when the surface of the submerged film 33 is choked with the SS (suspended solid), the surface can be cleaned by air exhausted from the air diffuser 35. Thus, it is possible to stabilize the function of the waste water treatment apparatus including that of the submerged film 33 for a long time.

The capacity of the SS separation tank 37 is so set that the retention time of the waste water therein is about three hours or less, similarly to the settling tank 19 of the first embodiment.

The reason the SS separation tank 37 is allowed to have a smaller capacity than the settling tank is because the method of treating the waste water in the settling tank is conventionally physical settling method, whereas the waste water treatment method by the submerged film 33 and the pump 34 is forced physical settling method. Thus, even though the SS separation tank 37 has a small capacity, its waste water-treating performance is preferable. That is, it is possible to use the SS separation tank 37 having a smaller capacity than the settling tank. More specifically, there is no problem even though the SS separation tank 37 is so constructed that it has a capacity about half of that of the settling tank, depending on the design of the submerged film 33. As the submerged film 33, the ultra filter film (manufactured by Kabushikikaisha Kubota) or the micro filter film (manufactured by Mitsubishi Rayon Ltd.) can be selected. The material of the SS separation tank 37 is not limited to a specific one but concrete or iron is used.

The floc sludge- and unreacted chemical-containing waste water discharged from the high molecular coagulating tank (sixth tank) 17 flows into the SS separation tank 37 and is minutely filtered with the submerged film 33. The submerged film pump 34 discharges the treated water minutely filtered to the outside of the waste water treatment system.

While, the sludge return pump 21 returns waste water containing the unreacted chemicals and stored in the lower portion or the entire portion of the SS separation tank 37 to the return sludge reaction tank 3 in which the unreacted chemicals are treated with the fluorine-containing waste water. The waste water treatment apparatus of the 12th embodiment has the SS separation tank 37 in place of the settling tank. Therefore, unlike the conventional settling tank in which the flow-out of SS (suspended solid) often occurs, the waste water treatment apparatus of the seventh embodiment will not cause SS flow out and can maintain the SS concentration of the treated water reliably. Because in the waste water treatment apparatus of the 12th embodiment, the film separation device is constructed of the submergence film 33, the film separation device can be mounted in the tank of the SS separation tank 37, namely, in the water. Thus, the 12th embodiment has the effect of eliminating the increase of the installing area.

(13th Embodiment)

Figure 17:
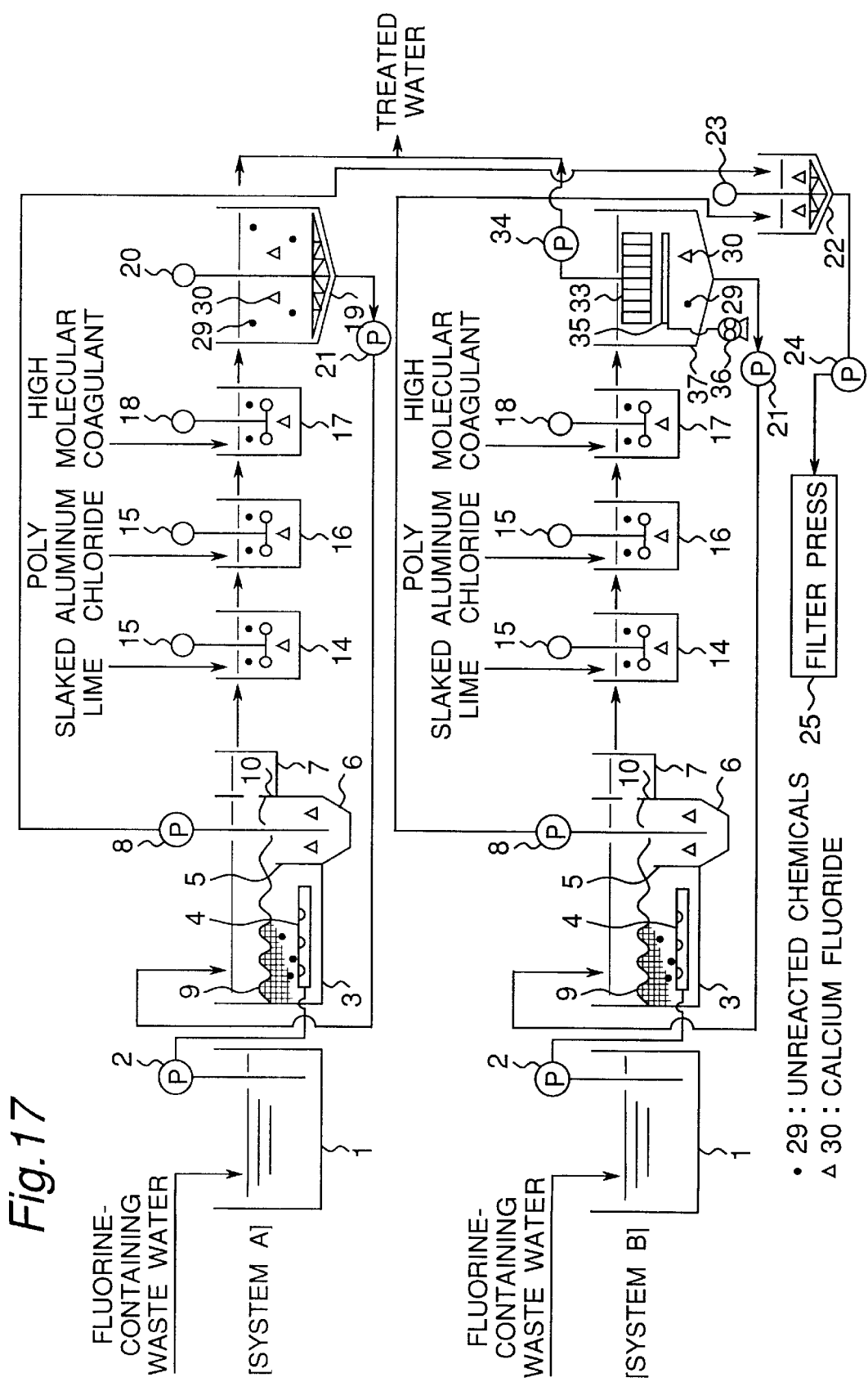
FIG. 17 is a block diagram showing a 13th embodiment of the waste water treatment apparatus of the present invention.

FIG. 17 shows a 13th embodiment of the waste water treatment apparatus of the present invention. In the 13th embodiment, waste water treatment apparatus includes two waste water treatment systems, and treated water of both systems is confluent with each other, except that the two systems have one thickening tank 22, one filter press pump 24, and one filter press 25 in common.

In one system (indicated as system A) of the two systems, the treatment flow upstream of the thickening tank 22 is similar to that of the first embodiment (FIG. 1), while in the other system (indicated as system B) of the two systems, the treatment flow upstream of the thickening tank 22 is similar to that of the seventh embodiment (FIG. 9).

Therefore, the same constituents as those of the first and sixth embodiments are denoted by the same reference numerals. Thus, only the characteristic points of the 13th embodiment are described below in detail.

Referring to FIG. 17, a floc may flow out from the settling tank 19 of the upper-stage system A, depending on the condition of the slaked lime reaction tank 14, the poly aluminum chloride coagulating tank 16, and the high molecular coagulating tank 17. In this case, the quality of treated water of the settling tank 19 may deteriorate. When the quality of the fluorine-containing waste water flowing into the raw water tank 1 fluctuates extremely, the quality of the treated water may deteriorate.

However, in the SS separation tank 37 of the lower-stage system B, the submerged film 33 filters suspended solid such as flocs reliably. Thus, the system B does not fall into such a situation as the system A has.

If the reaction state or the coagulation state in the slaked lime reaction tank 14, the poly aluminum chloride coagulating tank 16, and the high molecular coagulating tank 17 deteriorates and if flocs float in the SS separation tank 37, the submerged film 33 filters them. Thus, no serious problems occur.

Accordingly, in case the quality of the system A deteriorates, all waste water is treated by the system B or each the amount of water to be introduced into the system A and system B is adjusted under checking the quality of the treated water. In this manner, desired water quality can be secured. The fluorine-containing waste water treatment apparatus can be composed only of the system B. However, the initial cost of the submerged film 33 installed in the SS separation tank 37 of the system B is high. Thus, both the systems A and B are prepared.

In a region where the SS (suspended solid) discharge is strictly regulated, it is desirable not to use the system A only, but to use the systems A and B in combination as shown in the 13th embodiment or install the system B only, although the initial cost is high.

(14th Embodiment)

Figure 18:
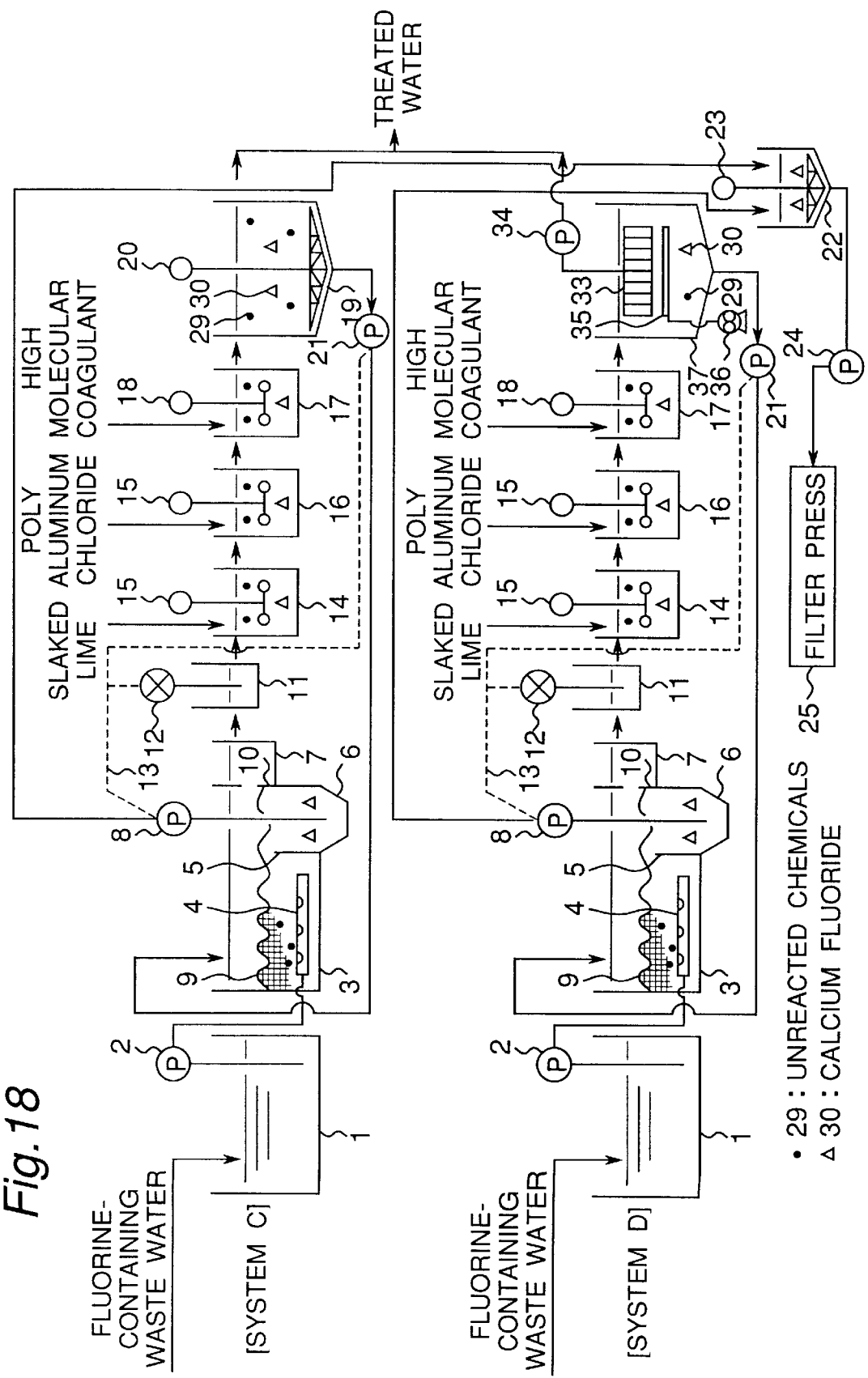
FIG. 18 is a block diagram showing a 14th embodiment of the waste water treatment apparatus of the present invention.
Figure 19:
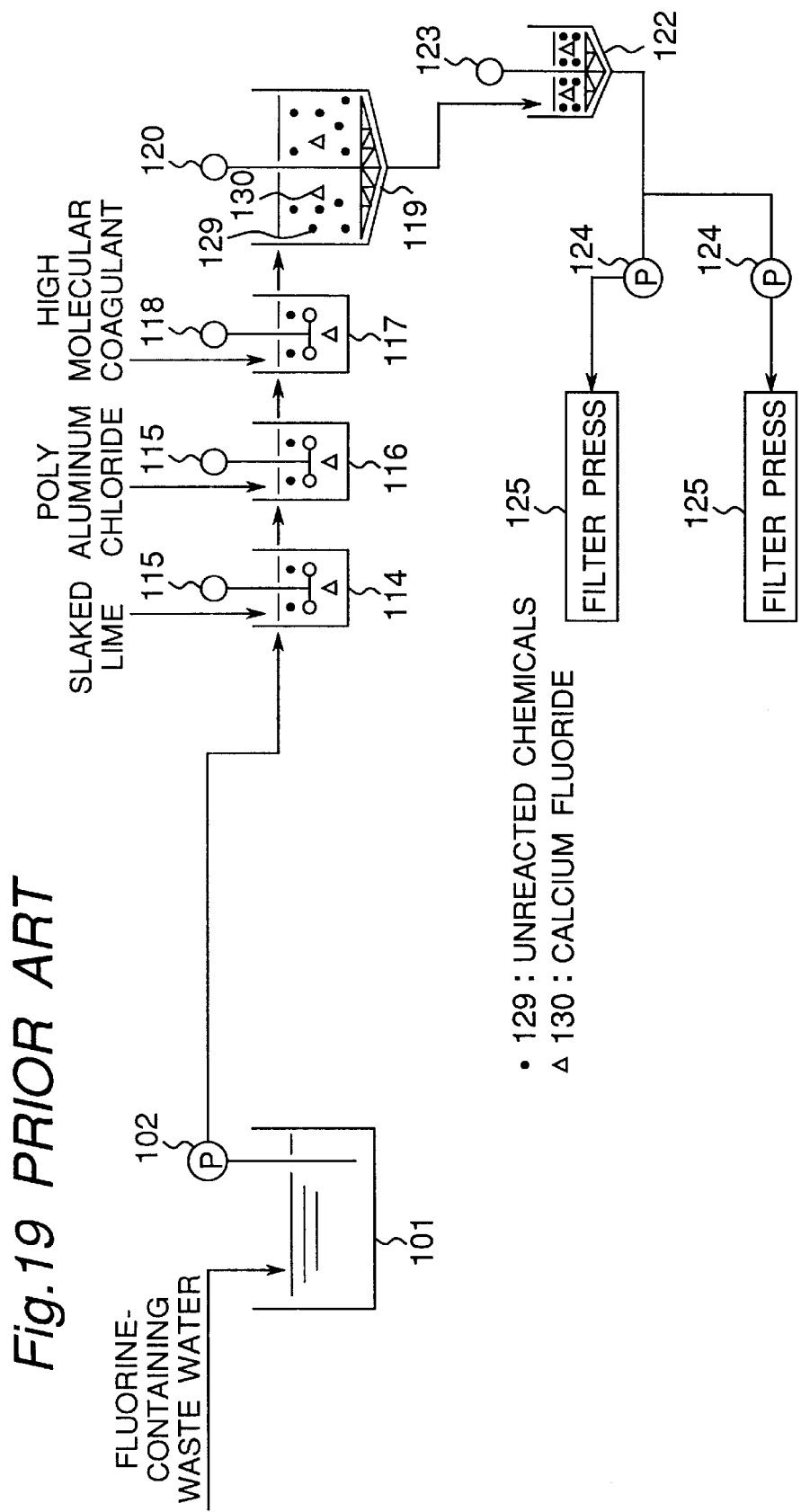
FIG. 19 is a diagram showing the construction of a first prior art.
Figure 20:
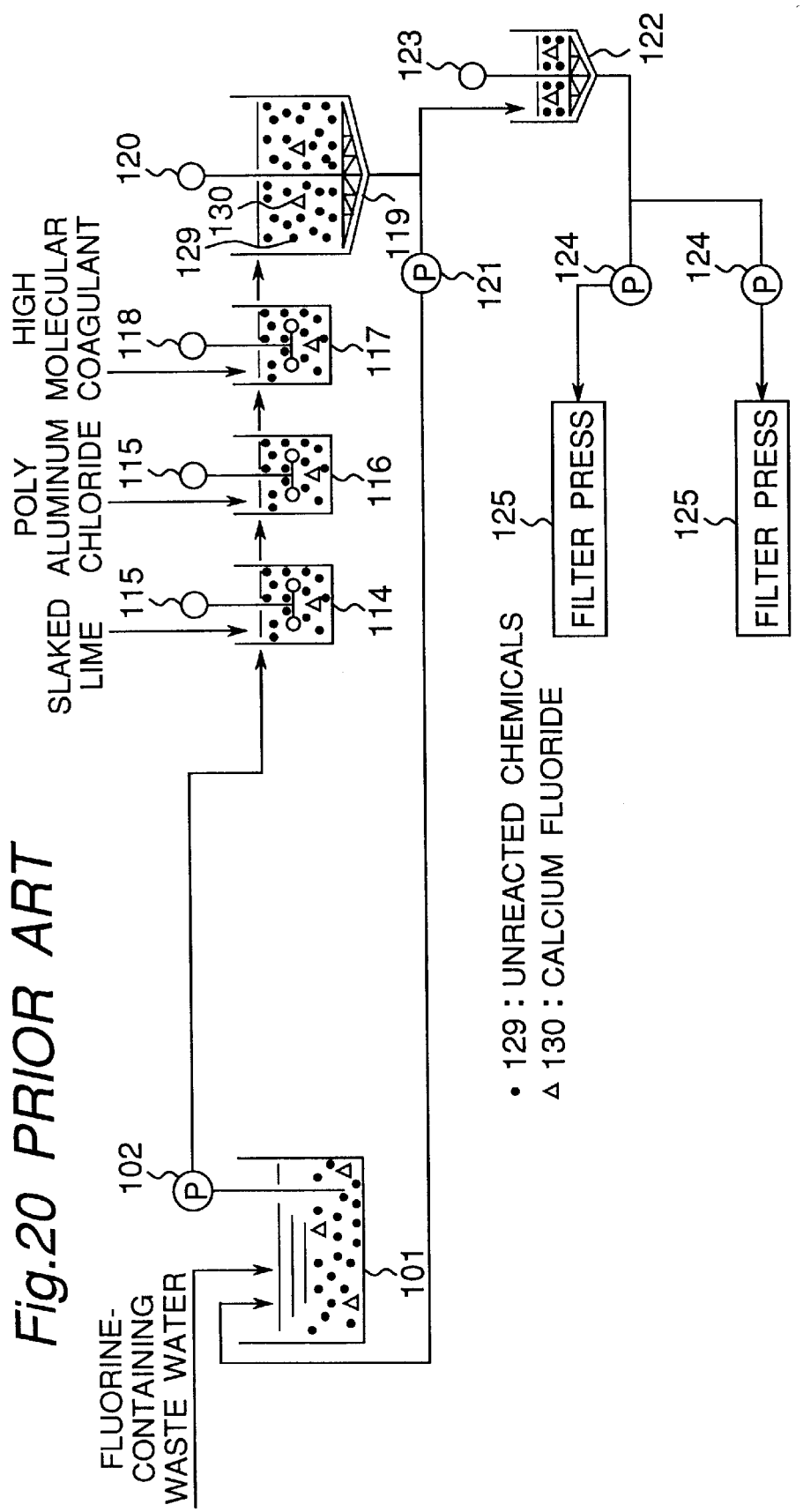
FIG. 20 is a diagram showing the construction of a second prior art.
Figure 21:
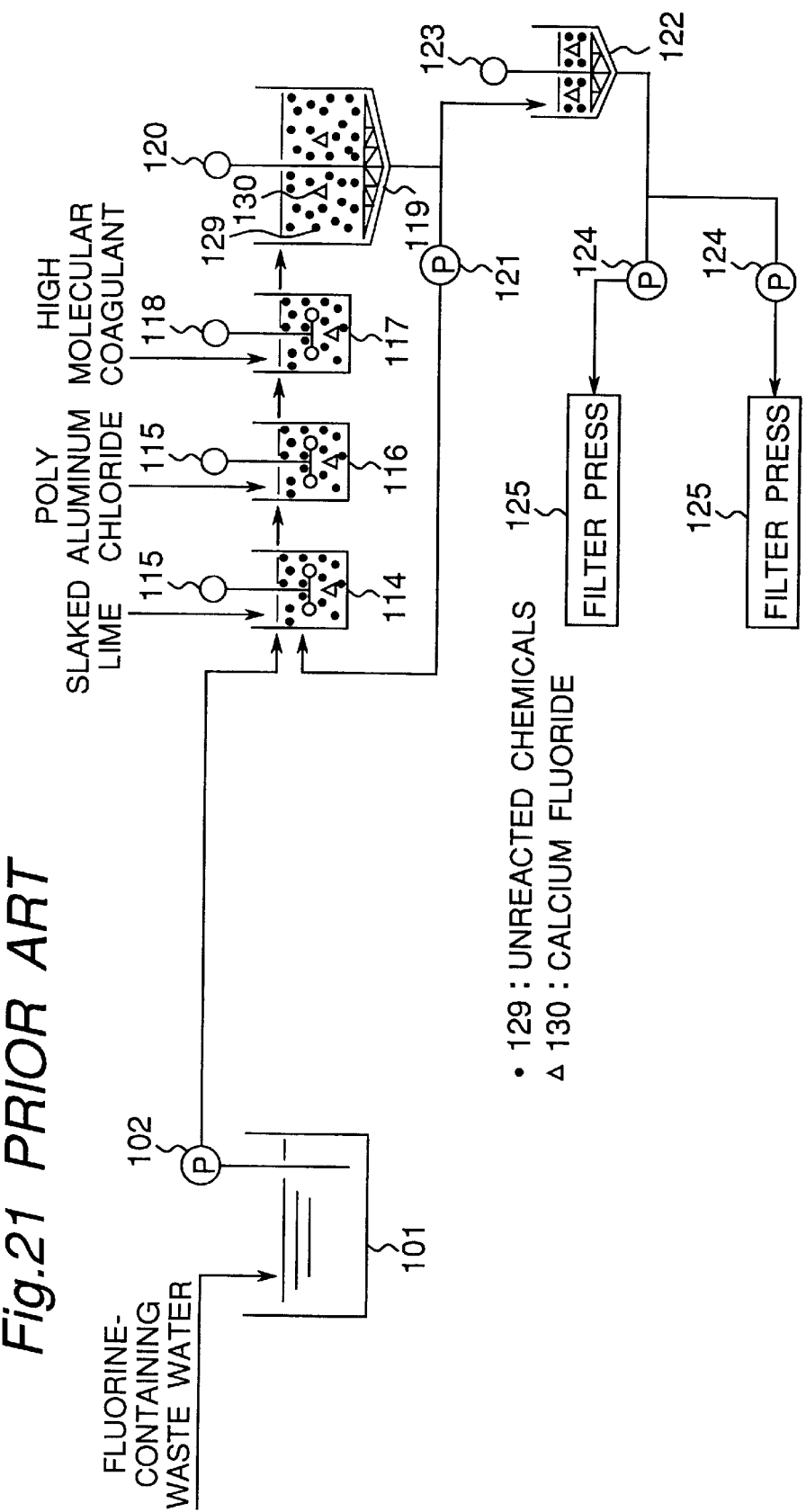
FIG. 21 is a diagram showing the construction of a third prior art.
Figure 22:
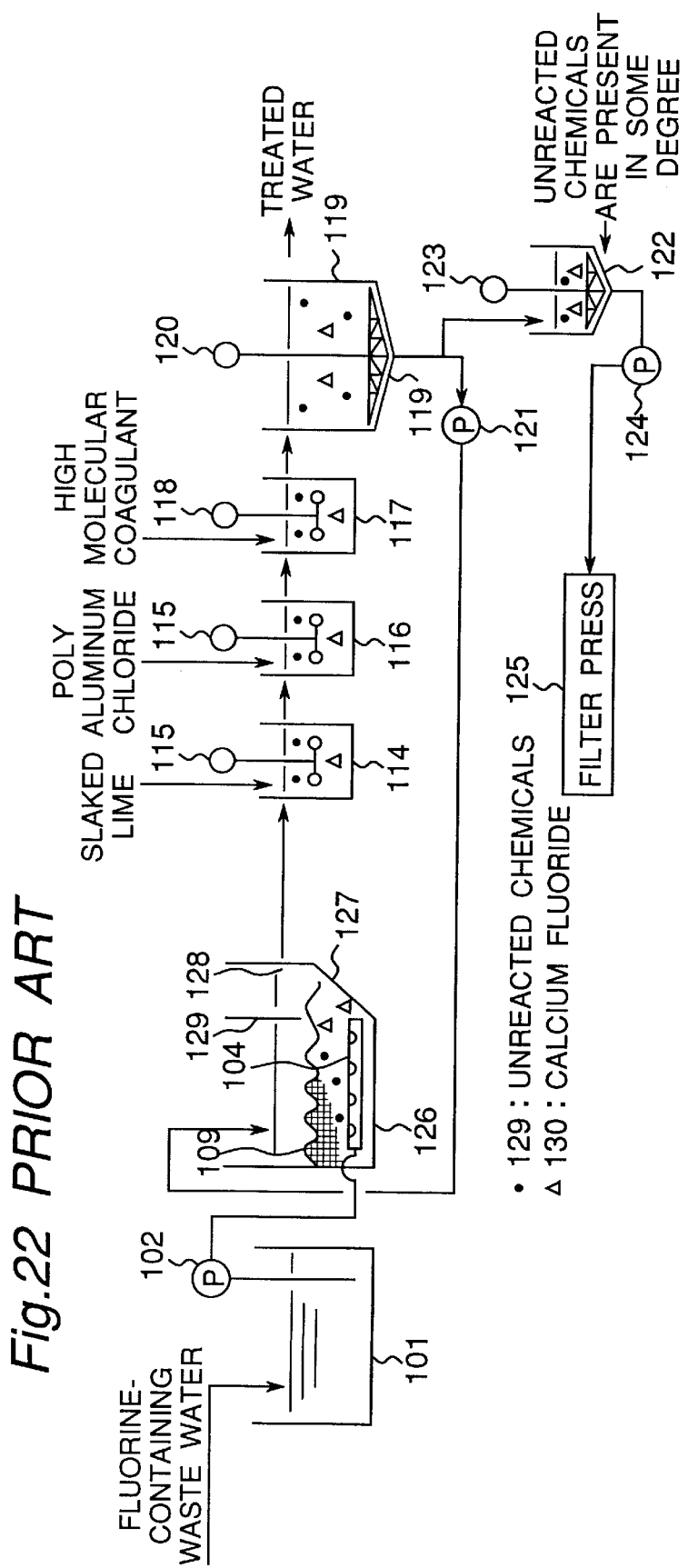
FIG. 22 is a diagram showing the construction of a reference example.

FIG. 18 shows a 14th embodiment of the waste water treatment apparatus of the present invention. In the 14th embodiment, waste water treatment apparatus includes two waste water treatment systems C and D, and treated water of both systems is confluent with each other, except that the two systems have one thickening tank 22, one filter press pump 24, and one filter press 25 in common.

In one system (indicated as system C) of the two systems, the treatment flow upstream of the thickening tank 22 is similar to that of the second embodiment (FIG. 3), while in the other system (indicated as system D) of the two systems, the treatment flow upstream of the thickening tank 22 is similar to that of the eighth embodiment (FIG. 11).

Therefore, the same constituents as those of the second and eighth embodiments are denoted by the same reference numerals. Thus, only the characteristic points of the 13th embodiment are described below in detail.

Referring to FIG. 18, a floc may flow out from the settling tank 19 of the upper-stage system C, depending on the condition of the slaked lime reaction tank 14, the poly aluminum chloride coagulating tank 16, and the high molecular coagulating tank 17. In this case, the quality of treated water of the settling tank 19 may deteriorate.

When the quality of the fluorine-containing waste water flowing into the raw water tank 1 fluctuates extremely, the quality of the treated water may deteriorate.

However, in the SS separation tank 37 of the lower-stage system D, the submerged film 33 filters suspended solid such as flocs reliably. Thus, the system D does not fall into such a situation as the system C has.

If the reaction state or the coagulation state in the slaked lime reaction tank 14, the poly aluminum chloride coagulating tank 16, and the high molecular coagulating tank 17 deteriorates and if flocs float in the SS separation tank 37, the submerged film 33 filters them. Thus, no serious problems occur.

Accordingly, in case the quality of the system C deteriorates, all waste water is treated by the system D or each the amount of water to be introduced into the system B and system D is adjusted under checking the quality of the treated water. In this manner, desired water quality can be secured. The fluorine-containing waste water treatment apparatus can be composed only of the system D. However, the initial cost of the submerged film 33 installed in the SS separation tank 37 of the system D is high. Thus, both the systems C and D are prepared.

In a region where the SS (suspended solid) discharge is strictly regulated, it is desirable not to use the system C only, but to use the systems C and D in combination as shown in the 13th embodiment or install the system D only, although the initial cost is high.

(EXAMPLE)

(First Example)

An example of waste water treatment using a waste water treatment apparatus having the same construction as that of the first embodiment shown in FIG. 1 is described below.

In the first example, the capacity of the raw water tank 1 was about 200 $m^3$, that of the return sludge reaction tank was about 600 $m^3$, that of each of the slaked lime reaction tank 14, the poly aluminum chloride coagulating tank 16, and the high molecular coagulating tank 17 was about 10 $m^3$, and that of the settling tank 19 was about 300 $m^3$.

Waster water having PH 2.1 and fluorine concentration 163 ppm was treated by the apparatus. The result was that treated water had PH 7.3 and a fluorine concentration 10 ppm.

(Second Example)

An example of waste water treatment using a waste water treatment apparatus having the same construction as that of the seventh embodiment shown in FIG. 9 is described below.

In the second example, the capacity of the raw water tank 1 was about 2 $m^3$, that of the return sludge reaction tank was about 6 $m^3$, that of each of the slaked lime reaction tank 14, the poly aluminum chloride coagulating tank 16, and the high molecular coagulating tank 17 was about 1 $m^3$, and that of the SS separation tank 37 was about 3 $m^3$.

Waster water having PH 2.2 and fluorine concentration 155 ppm was treated by the apparatus. The result was that treated water had PH 7.3 and a fluorine concentration 6 ppm.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A waste water treatment method comprising:
   introducing fluorine-containing waste water from a return sludge reaction tank having a settling section at its rear portion into a settling tank located at a succeeding stage of a waste water treatment system subsequent to the return sludge reaction tank;
   introducing sludge which has settled in the settling tank into the return sludge reaction tank;
   pumping heavy sludge which has settled in said settling section of said return sludge reaction tank from said settling section to a thickening tank thereby bypassing said settling tank; and
   wherein said settling section of said return sludge reaction tank is defined by at least one separating wall which allows heavy reacted sludge to fall into and settle in said settling section and substantially prevents less heavy reacted sludge from settling in said settling section.

2. The method of claim 1, wherein waste water is introduced into the return sludge reaction tank at a lower portion thereof while return sludge is introduced into the return sludge reaction tank at an upper portion thereof, and the return sludge reaction tank has neither a stirring means nor an aerating means.

3. A waste water treatment apparatus comprising:
   a return sludge reaction tank into which fluorine-containing waste water is introduced and which has a settling section at a rear portion thereof;
   a settling tank located at a succeeding stage of the apparatus subsequent to the return sludge reaction tank;
   a sludge return means for returning sludge settled in the settling tank to the return sludge reaction tank;
   means for pumping heavy sludge from said settling section of said return sludge reaction tank to a thickening tank of the apparatus so as to bypass said settling tank; and
   wherein said settling section of said return sludge reaction tank is defined by at least one separating wall which allows heavy reacted sludge to fall into and settle in said settling section and substantially prevents less heavy reacted sludge from settling in said settling section.

4. A waste water treatment apparatus according to claim 3, wherein a sludge carrying out means is installed in the settling section of the return sludge reaction tank.

5. A waste water treatment apparatus according to claim 4, wherein said sludge carrying out means consists of a pump.

6. A waste water treatment apparatus according to claim 3, wherein said return sludge reaction tank has a reaction section, the settling section, and a supernatant section located sequentially from a front portion of the return sludge reaction tank.

7. A waste water treatment apparatus for treating fluorine-containing waste water comprising:
   means for sequentially introducing said fluorine-containing waste water into a return sludge reaction tank having a settling section at a rear portion thereof,
   a supernatant, measurement tank having a measuring instrument,
   a reaction tank,
   a coagulating tank,
   a settling tank,
   means for returning an entire amount of sludge settled in the settling tank to the return sludge reaction tank by means of a sludge return pump;
   means for pumping sludge from said settling section of said return sludge reaction tank to a subsequent stage of the apparatus in a manner so as to bypass said settling tank and;
   wherein said settling section of said return sludge reaction tank is defined by at least one separating wall which allows heavy reacted sludge to fall into and settle in said settling section and substantially prevents less heavy reacted sludge from settling in said settling section.

8. A waste water treatment apparatus according to claim 7, further provided with a sludge carrying out means installed on the settling section of the return sludge reaction tank and a sludge return pump installed on the settling tank, wherein carrying-out amount of the sludge carrying out means and discharge amount of the sludge return pump are controlled by an inverter according to a measured result of the measuring instrument.

9. A waste water treatment apparatus according to claim 8, wherein said measuring instrument of the supernatant measurement tank consists of a suspended solid densitometer.

10. A waste water treatment apparatus according to claim 8, wherein said measuring instrument of the supernatant measurement tank consists of a PH meter.

11. A waste water treatment apparatus according to claim 8, wherein said measuring instrument of the supernatant measurement tank consists of a suspended solid meter and a PH meter.

12. The apparatus of claim 7, wherein waste water is introduced into the return sludge reaction tank at a lower portion thereof while return sludge is introduced into the return sludge reaction tank at an upper portion thereof, and the return sludge reaction tank has neither a stirring means nor an aerating means.

13. A waste water treatment apparatus for treating fluorine-containing waste water comprising:

means for sequentially introducing said fluorine-containing waste water into a return sludge reaction tank having a settling section at a rear portion thereof, a supernatant measurement tank having a measuring instrument, a reaction tank, a coagulating tank, a suspended solid separation tank;

means for returning an entire amount of sludge settled in the suspended solid separation tank to the return sludge reaction tank by means of a sludge return pump;

means for pumping heavy sludge from said settling section of said return sludge reaction tank to a thickening tank so as to bypass said reaction tank; and wherein said settling section of said return sludge reaction tank is defined by at least one separating wall which allows heavy reacted sludge to fall into and settle in said settling section and substantially prevents less heavy reacted sludge from settling in said settling section.

14. A waste water treatment apparatus according to claim 13, wherein a film separation device is installed in the suspended solid separation tank.

15. A waste water treatment apparatus according to claim 14, wherein the film separation device is constructed of a submerged film.

16. A waste water treatment apparatus according to claim 15, wherein said submerged film consists of an ultra filter film or a micro filter film.

17. A waste water treatment apparatus according to claim 15, wherein an aeration device is installed below the submerged film.

18. The apparatus of claim 13, wherein waste water is introduced into the return sludge reaction tank at a lower portion thereof while return sludge is introduced into the return sludge reaction tank at an upper portion thereof, and the return sludge reaction tank has neither a stirring means nor an aerating means.

19. A waste water treatment apparatus comprising:

a return sludge reaction tank into which fluorine-containing waste water is introduced and which has a settling section at a rear portion thereof;

a settling tank located at a succeeding stage of the apparatus subsequent to the return sludge reaction tank;

a sludge return means for returning sludge settled in the settling tank to the return sludge reaction tank;

means for pumping heavy sludge from said settling section of said return sludge reaction tank to a thickening tank of the apparatus so as to bypass said settling tank; and wherein the waste water is introduced into the return sludge reaction tank at a lower portion thereof while the return sludge is introduced into the return sludge reaction tank at an upper portion thereof, and the return sludge reaction tank has neither a stirring means nor an aerating means.

* * * * *